United States Patent [19]

Nada

[11] Patent Number: 5,172,320
[45] Date of Patent: Dec. 15, 1992

[54] AIR-FUEL RATIO FEEDBACK CONTROL SYSTEM HAVING SINGLE AIR-FUEL RATIO SENSOR DOWNSTREAM OF OR WITHIN THREE-WAY CATALYST CONVERTER

[75] Inventor: Mitsuhiro Nada, Susono, Japan

[73] Assignee: Toyota Jidosha Kabushiki Kaisha, Toyota, Japan

[21] Appl. No.: 487,454

[22] Filed: Mar. 1, 1990

[30] Foreign Application Priority Data

| Mar. 3, 1989 | [JP] | Japan | 1-050161 |
| Nov. 17, 1989 | [JP] | Japan | 1-297680 |
| Feb. 2, 1990 | [JP] | Japan | 2-22141 |

[51] Int. Cl.$^5$ .................. F01N 3/00; F02M 51/00
[52] U.S. Cl. .................. 364/431.05; 60/276; 60/285; 123/674
[58] Field of Search ........ 364/431.05, 431.04; 123/440, 489; 60/276, 273, 274, 285

[56] References Cited

U.S. PATENT DOCUMENTS

| 4,817,384 | 4/1989 | Okumura et al. | 123/489 X |
| 4,840,027 | 6/1989 | Okumura | 123/489 X |
| 4,941,318 | 7/1990 | Matsuoka | 123/489 X |

FOREIGN PATENT DOCUMENTS

| 52-81438 | 7/1977 | Japan . |
| 56-23531 | 3/1981 | Japan . |
| 56-23532 | 3/1981 | Japan . |
| 56-23533 | 3/1981 | Japan . |
| 56-126647 | 10/1981 | Japan . |
| 56-126648 | 10/1981 | Japan . |
| 56-126649 | 10/1981 | Japan . |
| 56-126650 | 10/1981 | Japan . |
| 57-135243 | 8/1982 | Japan . |
| 58-48745 | 3/1983 | Japan . |
| 1-53042 | 3/1989 | Japan . |

Primary Examiner—Parshotam S. Lall
Assistant Examiner—E. J. Pipala
Attorney, Agent, or Firm—Kenyon & Kenyon

[57] ABSTRACT

In an air-fuel ratio feedback system including a single air-fuel ratio sensor downstream of or within a three-way catalyst converter, a coarse-adjusting term $AF_c$ is calculated integrally in accordance with the output of the air-fuel ratio sensor, and an $O_2$ storage term $AF_{CCRO}$ is calculated in accordance with an $O_2$ storage amount of the three-way catalyst converter.

64 Claims, 33 Drawing Sheets

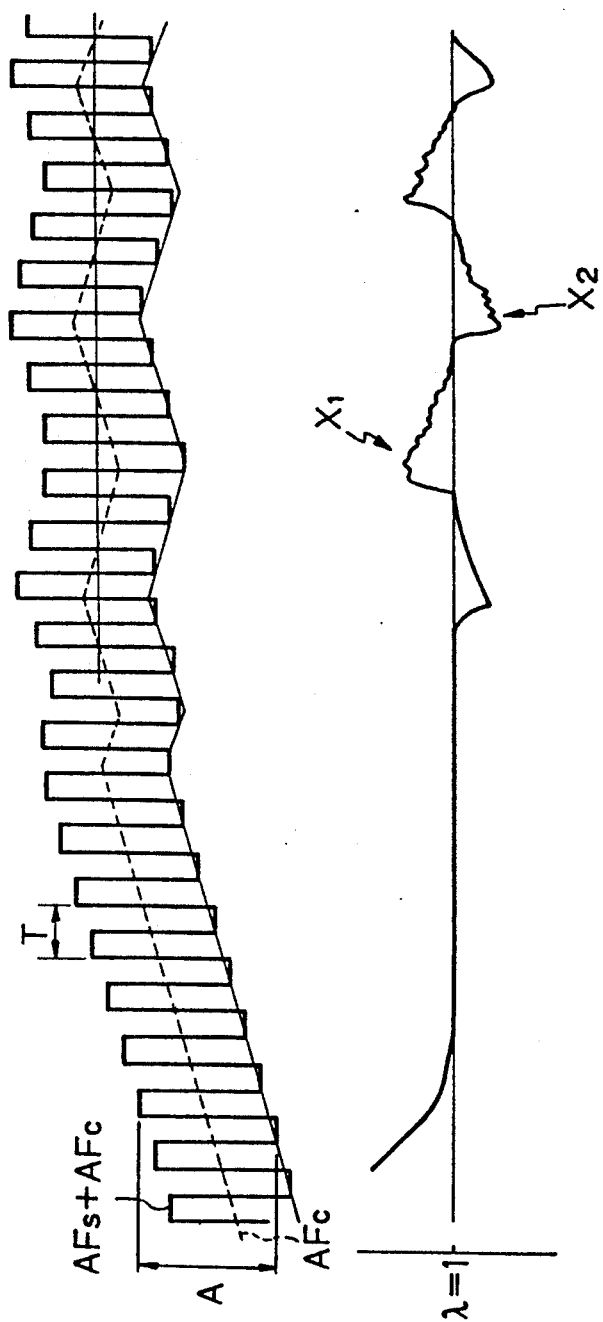

Fig. 2A
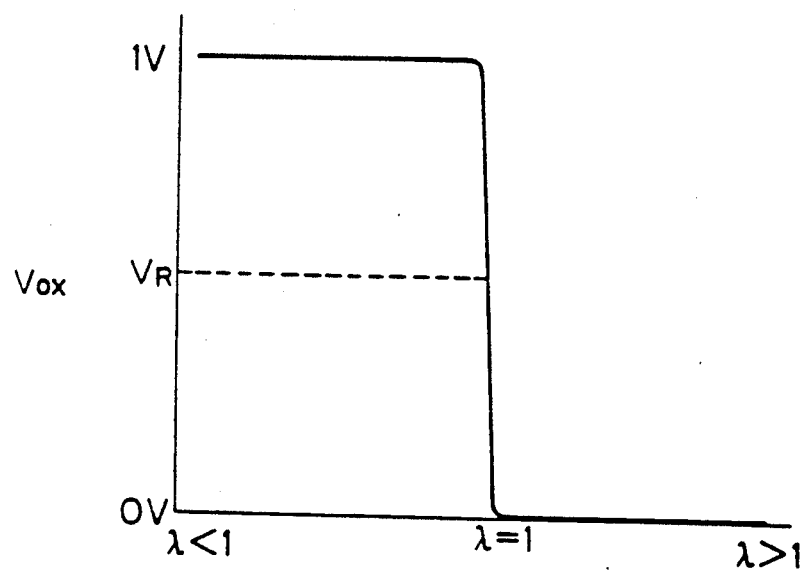
A/F
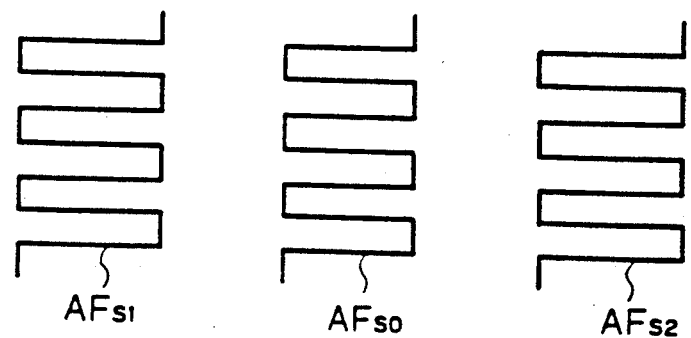
Fig. 2B    Fig. 2C    Fig. 2D

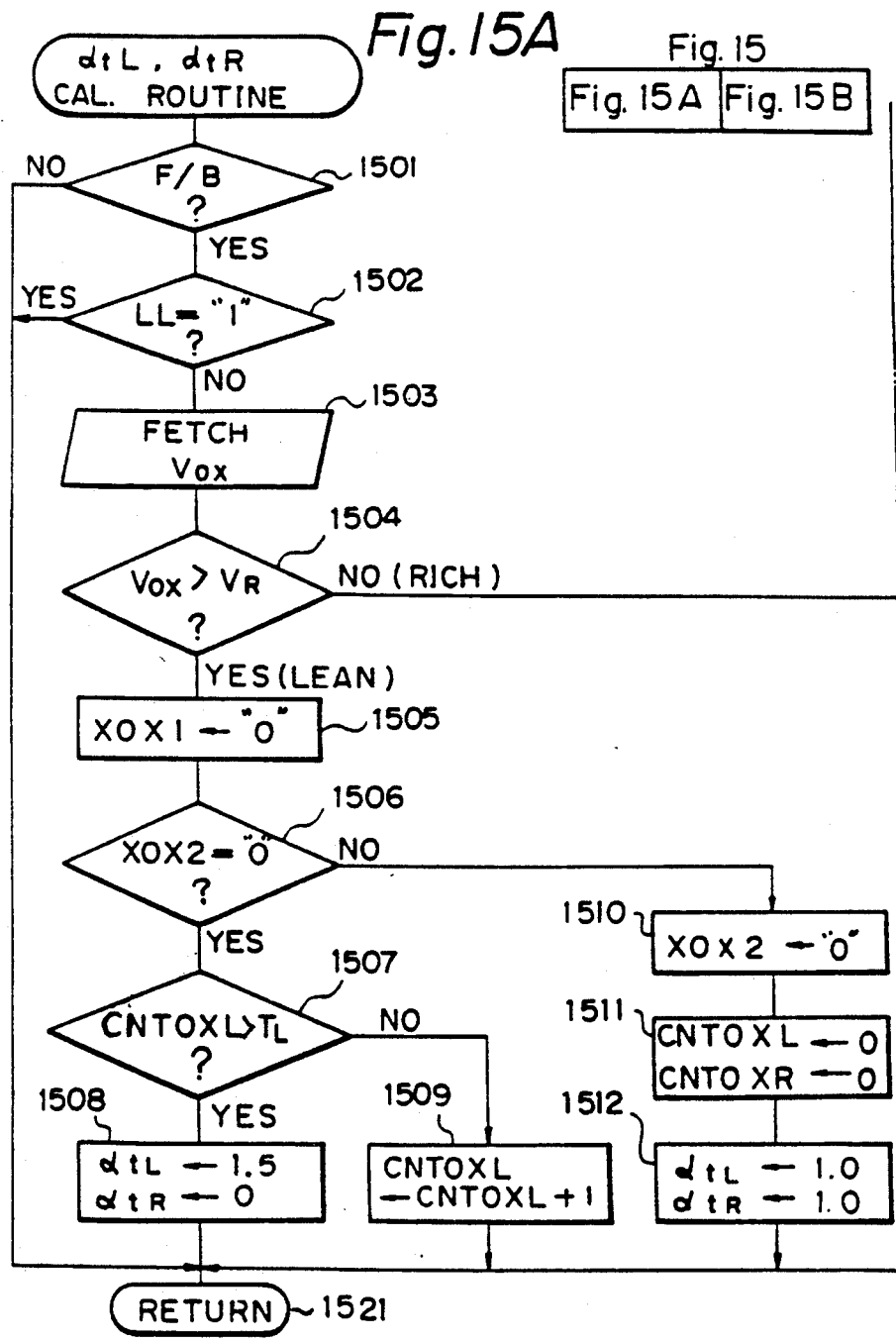

| Fig.25A | Fig.25B |

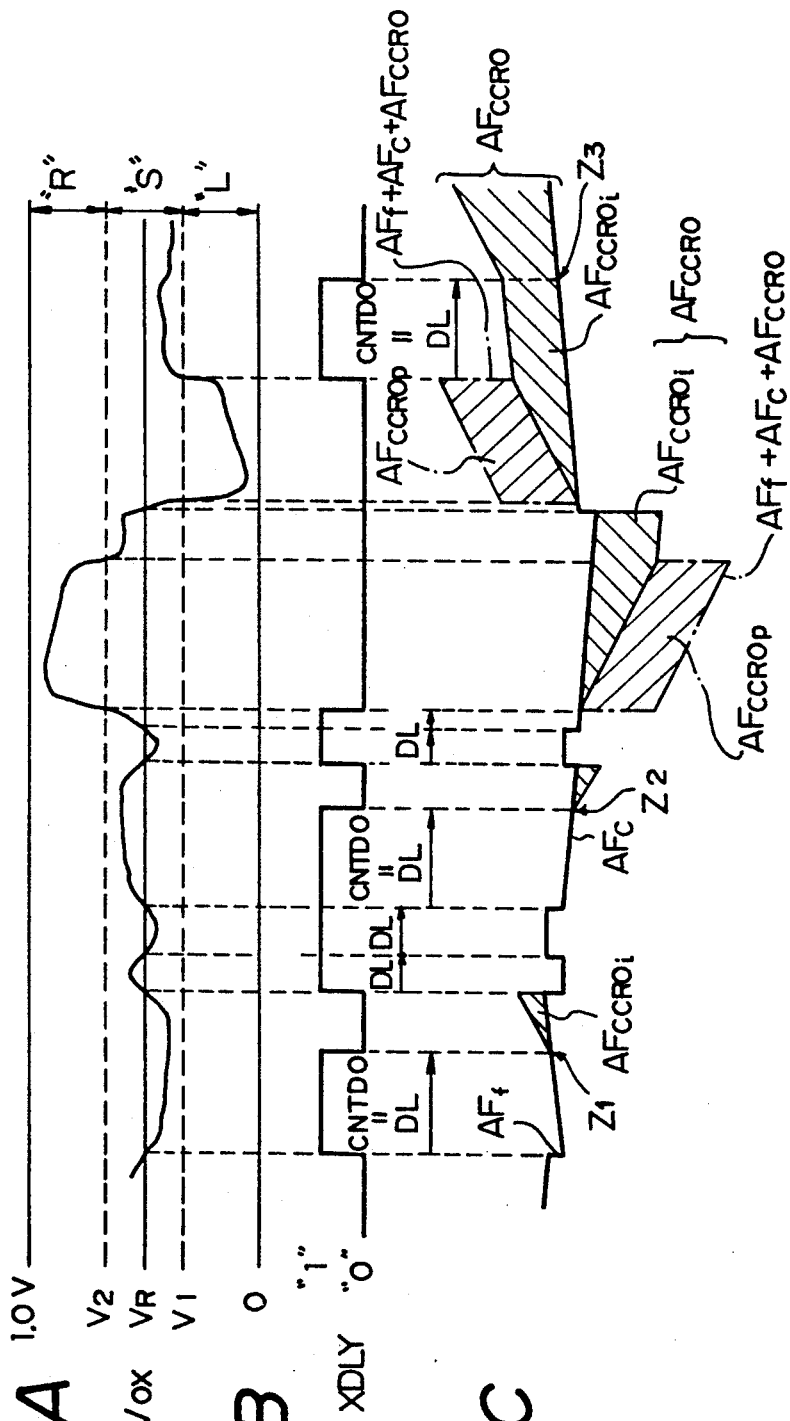

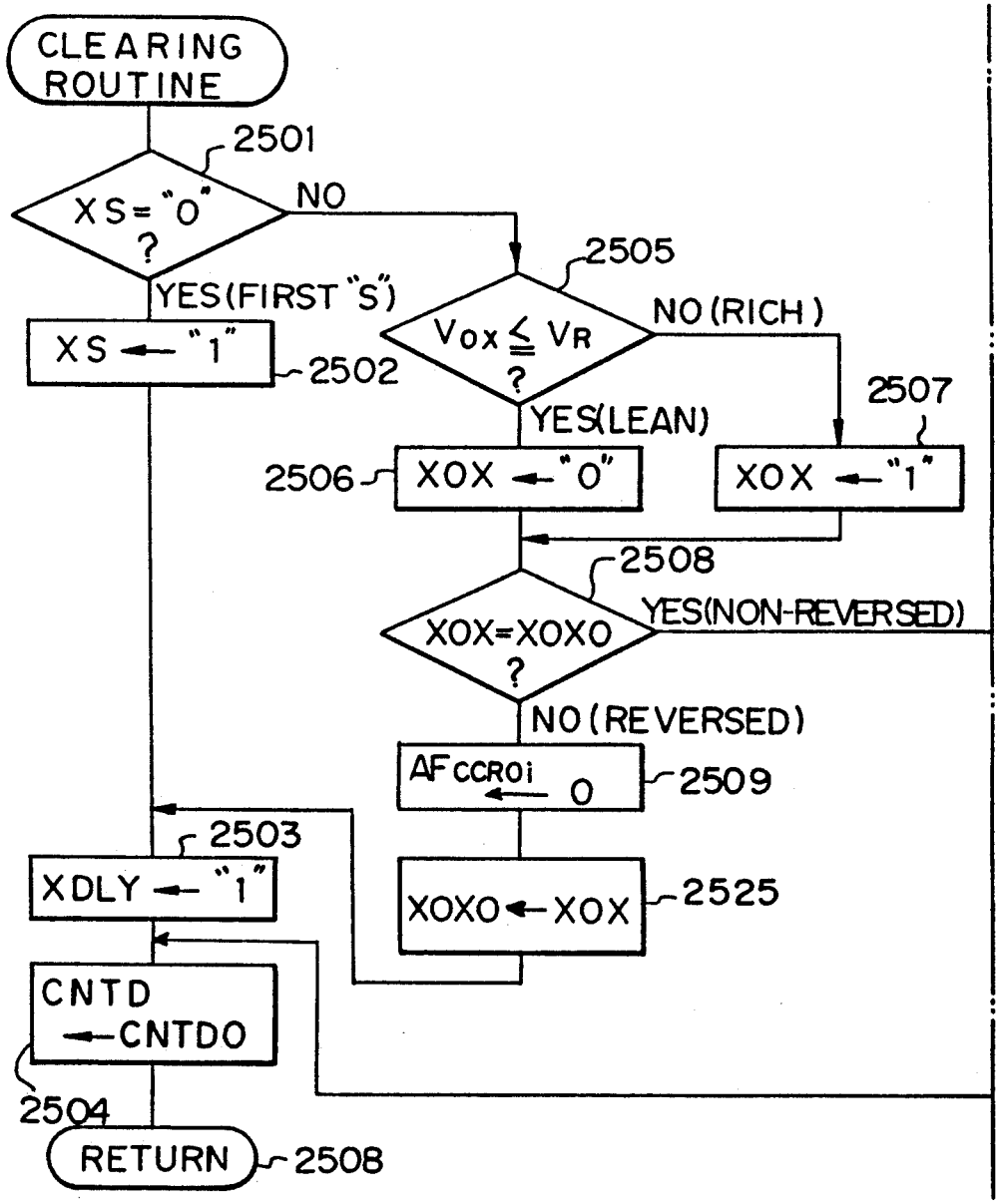

AIR-FUEL RATIO FEEDBACK CONTROL SYSTEM HAVING SINGLE AIR-FUEL RATIO SENSOR DOWNSTREAM OF OR WITHIN THREE-WAY CATALYST CONVERTER

BACKGROUND OF THE INVENTION

1. Field of the Invention

The present invention relates to an air-fuel ratio feedback control system in an internal combustion engine having a single air-fuel ratio sensor downstream of or within a three-way reducing and oxidizing catalyst converter within an exhaust gas passage.

2. Description of the Related Art

As known air-fuel ratio feedback control systems using air-fuel ratio sensors ($O_2$ sensors), there exist a single $O_2$ sensor system having a single $O_2$ sensor and a double $O_2$ sensor system having two $O_2$ sensors one upstream and one downstream of the catalyst converter. Note, in a single $O_2$ sensor system, the $O_2$ sensor is disposed either upstream or downstream of the catalyst converter.

In a single $O_2$ sensor system having an $O_2$ sensor upstream of the catalyst converter, the $O_2$ sensor is disposed in an exhaust gas passage near to a combustion chamber, i.e., near the concentration portion of an exhaust manifold, upstream of the catalyst converter. In this system, however, the output characteristics of the $O_2$ sensor are directly affected by the non-uniformity or non-equilibrium of the exhaust gas. For example, when the air-fuel ratio actually indicates a rich state, but oxygen is still present, the output characteristics of the $O_2$ sensor are fluctuated. Also, in an internal combustion engine having a plurality of cylinders, the output characteristics of the $O_2$ sensor are also directly affected by individual differences between the cylinders, and accordingly, it is impossible to detect the mean air-fuel ratio within the entire engine, and thus the accuracy of the controlled air-fuel ratio is low.

On the other hand, in a single $O_2$ sensor system having an $O_2$ sensor downstream of the catalyst converter, the non-uniformity or non-equilibrium of the detected exhaust gas can be eliminated, and the mean air-fuel ratio within the entire engine can be detected. In this system, however, due to the long distance between the $O_2$ sensor and the exhaust valves, and because the capacity and cleaning efficiency of the catalyst converter depends upon its $O_2$ storage effect, the response characteristics of the $O_2$ sensor are lowered, thus reducing the response characteristics of an air-fuel ratio feedback control system. As a result, the efficiency of the catalyst converter cannot be sufficiently exhibited, thus increasing HC, CO, and $NO_x$ emissions.

Also, in the above-mentioned double $O_2$ sensor system, an air-fuel ratio feedback control operation is carried out by the downstream $O_2$ sensor in addition to an air-fuel ratio feedback control operation by the upstream $O_2$ sensor. For example, the mean air-fuel ratio is detected by the downstream $O_2$ sensor to reflect an air-fuel ratio feedback parameter such as skip amounts, and the air-fuel ratio feedback control for the entire system is carried out by the output of the upstream $O_2$ sensor and the air-fuel ratio feedback control parameter (see U.S. Pat. No. 4,693,076). Therefore, even if the output characteristics of the downstream $O_2$ sensor are not stable, good emission characteristics are obtained. In this double $O_2$ sensor system, however, two $O_2$ sensors are required, thus increasing the manufacturing cost, and further, when the frequency of the air-fuel ratio feedback control by the upstream $O_2$ sensor is increased by the aging of the parts of the engine or the like, the efficiency of the catalyst converter is lowered.

In view of the foregoing, the present inventor has already suggested a single $O_2$ sensor system having a downstream $O_2$ sensor in which a self-oscillating term $AF_s$ having a definite amplitude and a definite period is generated, and a mean value $AF_c$ of the self-oscillating term $AF_s$ is changed in accordance with the output of the downstream $O_2$ sensor, to thereby exhibit a full efficiency of the catalyst converter (see Japanese Unexamined Patent Publication (Kokai) No. 64-66441 published on Mar. 31, 1989). This single $O_2$ sensor system, however, does not provide a sufficient reduction of HC, CO, and $NO_x$ emissions when the $O_2$ storage effect of the catalyst converter is not fully exhibited. Namely, when the deviation of the air-fuel ratio upstream of the catalyst converter is far from the stoichiometric air-fuel ratio, and this deviation of the air-fuel ratio continues for a very long time, it is impossible to monitor the $O_2$ storage effect of the catalyst converter. As a result, the precision of the controlled air-fuel ratio is reduced and the HC, CO, and $NO_x$ emissions increased.

SUMMARY OF THE INVENTION

Therefore, an object of the present invention is to provide a single air-fuel ratio sensor system having an improved and superior cleaning-up function.

According to the present invention, in an air-fuel ratio feedback system including a single air-fuel ratio sensor downstream of or within a three-way catalyst converter, a coarse-adjusting term $AF_c$ is calculated integrally in accordance with the output of the air-fuel ratio sensor, and an $O_2$ storage term is calculated in accordance with an $O_2$ storage amount of the three-way catalyst converter.

Namely, since the control of the air-fuel ratio around the stoichiometric air-fuel ratio is carried out in accordance with the coarse-adjusting term $AF_c$, to exhibit a superior $O_2$ storage effect of the three-way catalyst converter, and since the $O_2$ storage term $AF_{CCRO}$ in accordance with the $O_2$ storage amount of the three-way catalyst converter is introduced into the air-fuel ratio control, the deviation of the air-fuel ratio due to the $O_2$ storage amount of the three-way catalyst converter can be reduced.

BRIEF DESCRIPTION OF THE DRAWINGS

The present invention will be more clearly understood from the description as set forth below with reference to the accompanying drawings.

FIGS. 1A, 1B, and 1C are timing diagrams showing the inventor's suggested single air-fuel sensor system;

FIGS. 2A, 2B, 2C and 2D are graphs showing the relationship between a self-oscillating wave and a cleaning function of a three-way catalyst converter;

FIGS. 4, 6, 8, 9, 11, 13, 14, 15, 15A, 15B, 16, 18, 20, 21, 23, 25, 25A, 25B, 27, 27A, 27B, and 27C, 29 and 31 are flow charts showing the operation of the control circuit of FIG. 3;

FIGS. 26A, 26B, and 26C are timing diagrams explaining the flow charts of FIGS. 20 and 25;

DESCRIPTION OF THE PREFERRED EMBODIMENTS

First, the inventor's suggested single air-fuel ratio sensor system having a single downstream $O_2$ sensor will be explained with reference to FIGS. 1A, 1B, 1C, and 2. When the output of the downstream $O_2$ sensor is changed as shown in FIG. 1A, the center of the self-oscillating term $AF_s$ having a definite amplitude A and a definite period T, i.e., the coarse-adjusting term $AF_c$, is changed in accordance with the output $V_{OX}$ of the $O_2$ sensor. In this case, when the output $V_{OX}$ of the $O_2$ sensor indicates a lean state, the coarse-adjusting term $AF_c$ is gradually increased, and when the output of the $O_2$ sensor indicates a rich state, the coarse-adjusting term $AF_c$ is gradually decreased; i.e., the coarse-adjusting term $AF_c$ is integrally controlled. Note that FIG. 1C shows the actual air-fuel ratio.

Referring to FIG. 2, when the self-oscillating term $AF_s$ (=$AF_{s0}$) is oscillated around the stoichiometric air-fuel ratio ($\lambda=1$), the three-way catalyst converter exhibits a full cleaning function. Conversely, when the self-oscillating term $AF_s$, which corresponds to $AF_{s1}$ or $AF_{s2}$, is oscillated around a rich air-fuel ratio ($\lambda<1$) or a lean air-fuel ratio ($\lambda>1$), the three-way catalyst converter cannot exhibit a full cleaning function. Therefore, to move the self-oscillating term $AF_{s1}$ or $AF_{s2}$ to $AF_{s0}$, the coarse-adjusting term (integration term) $AF_c$ is introduced into the control of the air-fuel ratio.

Nevertheless, even when the coarse-adjusting term $AF_c$ is introduced, the response characteristics of the $O_2$ sensor are changed in accordance with the flow amount and rate of the gas, the exposure of the gas, the composition of the gas, a purge time for which the $O_2$ sensor remains in a rich or lean air-fuel ratio atmosphere, and the like. Therefore, if the response characteristics of the $O_2$ sensor can effectively respond to the frequency of the self-oscillating term $AF_s$, no problem occurs, but since this type of $O_2$ sensor is located downstream of the three-way catalyst converter, the response characteristics of the $O_2$ sensor are poor due to the $O_2$ storage effect of the three-way catalyst converter. Thus, as indicated by $X_1$ and $X_2$ in FIG. 1C, convergence errors are generated in the air-fuel ratio downstream of the three-way catalyst converter due to the difference in phase between the gas introduced into the three-way catalyst converter and the gas discharged therefrom, and as a result, the reduction of HC, CO, and $NO_x$ emissions is insufficient.

Figure 3:
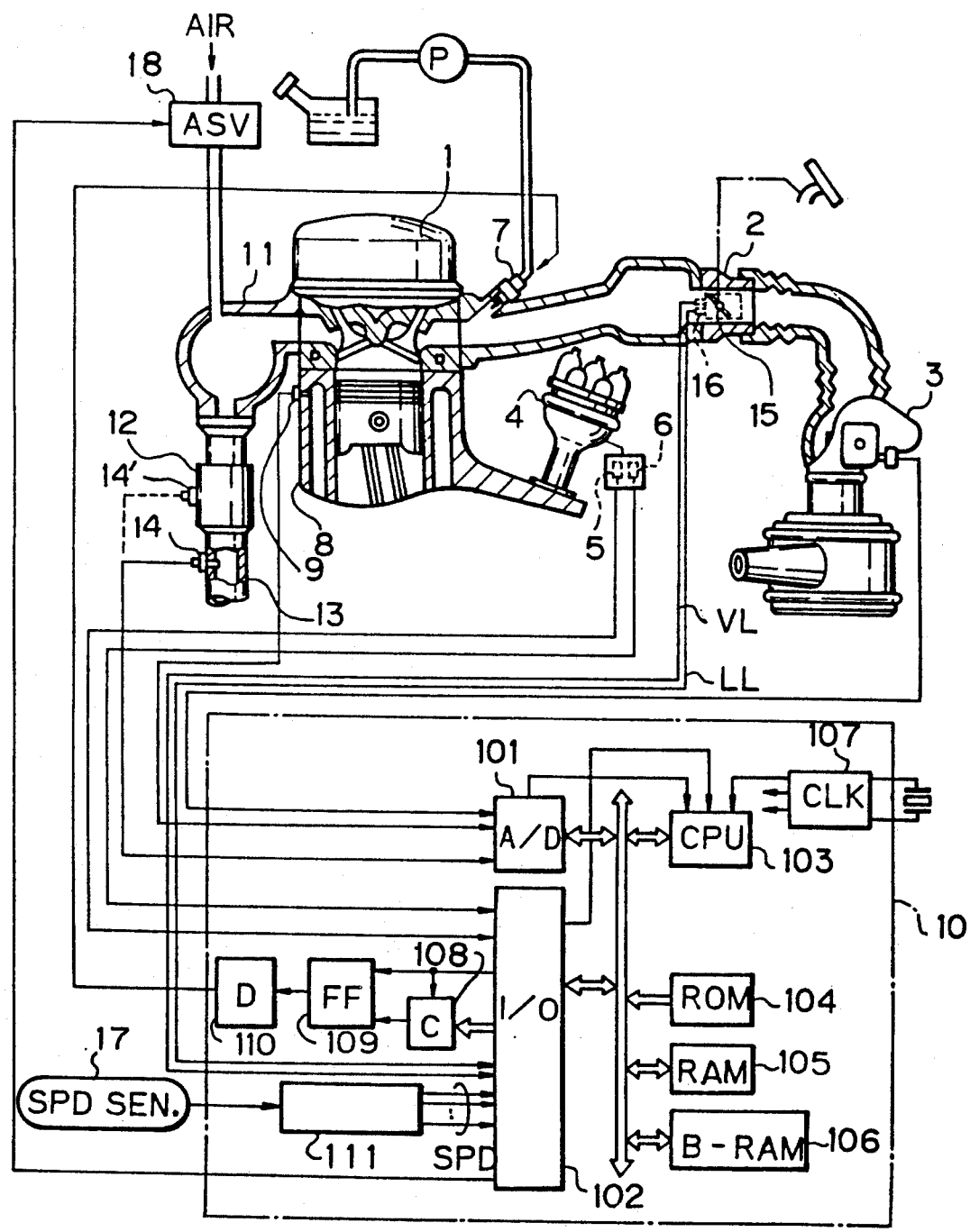
FIG. 3 is a schematic view of an internal combustion engine according to the present invention.

In FIG. 3, which illustrates an internal combustion engine according to the present invention, reference numeral 1 designates a four-cycle spark ignition engine disposed in an automotive vehicle. An air-intake passage 2 of the engine 1 is provided with a potentiometer-type airflow meter 3 for detecting the amount of air drawn into the engine 1, to generate an analog voltage signal in proportion to the amount of air flowing therethrough. The signal of the airflow meter 3 is transmitted to a multiplexer-incorporating analog-to-digital (A/D) converter 101 of a control circuit 10.

Disposed in a distributor 4 are crank angle sensors 5 and 6 for detecting the angle of the crankshaft (not shown) of the engine 1.

In this case, the crank angle sensor 5 generates a pulse signal at every 720° crank angle (CA) and the crank-angle sensor 6 generates a pulse signal at every 30° CA. The pulse signals of the crank angle sensors 5 and 6 are supplied to an input/output (I/O) interface 102 of the control circuit 10. Further, the pulse signal of the crank angle sensor 6 is then supplied to an interruption terminal of a central processing unit (CPU) 103.

Also provided in the air-intake passage 2 is a fuel injection valve 7 for supplying pressurized fuel from the fuel system to the air-intake port of the cylinder of the engine 1. In this case, other fuel injection valves are provided for other cylinders, but these are not shown in FIG. 3.

Disposed in a cylinder block 8 of the engine 1 is a coolant temperature sensor 9 for detecting the temperature of the coolant. The coolant temperature sensor 9 generates an analog voltage signal in response to the temperature THW of the coolant, and transmits that signal to the A/D converter 101 of the control circuit 10.

Provided in an exhaust system on the downstream-side of an exhaust manifold 11 is a three-way reducing and oxidizing catalyst converter 12 which removes three pollutants CO, HC, and $NO_x$ simultaneously from the exhaust gas.

Provided in an exhaust pipe 13 downstream of the catalyst converter 12 is an $O_2$ sensor 14 for detecting the concentration of oxygen composition in the exhaust gas. The $O_2$ sensor 14 generates an output voltage signal and transmits the signal to the A/D converter 101 of the control circuit 10. Note that an $O_2$ sensor 14' can be located within the catalyst converter 12, instead of the $O_2$ sensor 14 downstream of the catalyst converter 12.

Reference 15 designates a throttle valve, and 16 designates an throttle sensor which incorporates an idle switch for detecting when the throttle valve 15 is fully closed, and a full switch for detecting whether or not the opening of the throttle valve 15 is larger than a predetermined value, such as 70°. The output LL of the idle switch and the output VL of the full switch are supplied to the I/O interface 102 of the control circuit 10.

Reference 17 designates a vehicle speed sensor formed, for example, by a permanent magnet and a lead switch. The output of the vehicle speed sensor 17 is supplied to a vehicle speed forming circuit 111 of the control circuit 10, which circuit 111 generates binary data inversely proportional to the vehicle speed SPD.

Reference 18 designates an air suction valve of a secondary air supply system. When the engine is in a predetermined deceleration state or an idling state, the air suction valve 18 is opened to introduce secondary air into the exhaust manifold 11, thus reducing the HC and CO emissions. Also, when the coolant temperature THW is low, the air suction valve 18 is closed to stop the introduction of secondary air into the exhaust manifold 11, thereby preventing overheating of the exhaust system. The air suction valve 18 is controlled, via a vacuum switch valve (not shown), by the control circuit 10 using the data of the engine speed $N_e$, the vehicle speed SPD, the idle switch LL, the coolant temperature THW and the like.

The control circuit 10, which may be constructed by a microcomputer, further comprises a read-only memory (ROM) 104 for storing a main routine and interrupt routines such as a fuel injection routine, an ignition timing routine, tables (maps), constants, etc., a random access memory 105 (RAM) for storing temporary data, a backup RAM 106, a clock generator 107 for generating various clock signals, a down counter 108, a flip-flop 109, a driver circuit 110, and the like.

Note, that the battery (not shown) is connected directly to the backup RAM 106 and, therefore, the content thereof is not erased even when the ignition switch (not shown) is turned OFF.

The down counter 108, the flip-flop 109, and the driver circuit 110 are used for controlling the fuel injection valve 7. Namely, when a fuel injection amount TAU is calculated in a TAU routine, which will be later explained, the amount TAU is preset in the down counter 108, and simultaneously, the flip-flop 109 is set. As a result, the driver circuit 110 initiates the activation of the fuel injection valve 7. On the other hand, the down counter 108 counts up the clock signal from the clock generator 107, and finally generates a logic "1" signal from the borrow-out terminal of the down counter 108, to reset the flip-flop 109, so that the driver circuit 110 stops the activation of the fuel injection valve 7. Thus, the amount of fuel corresponding to the fuel injection amount TAU is injected into the fuel injection valve 7.

Interruptions occur at the CPU 103 when the A/D converter 101 completes an A/D conversion and generates an interrupt signal; when the crank angle sensor 6 generates a pulse signal; and when the clock generator 107 generates a special clock signal.

The intake air amount data Q of the airflow meter 3 and the coolant temperature data THW of the coolant sensor 9 are fetched by an A/D conversion routine(s) executed at predetermined intervals, and then stored in the RAM 105; i.e., the data Q and THW in the RAM 105 are renewed at predetermined intervals. The engine speed $N_e$ is calculated by an interrupt routine executed at 30° CA, i.e., at every pulse signal of the crank angle sensor 6, and is then stored in the RAM 105.

Figure 4:
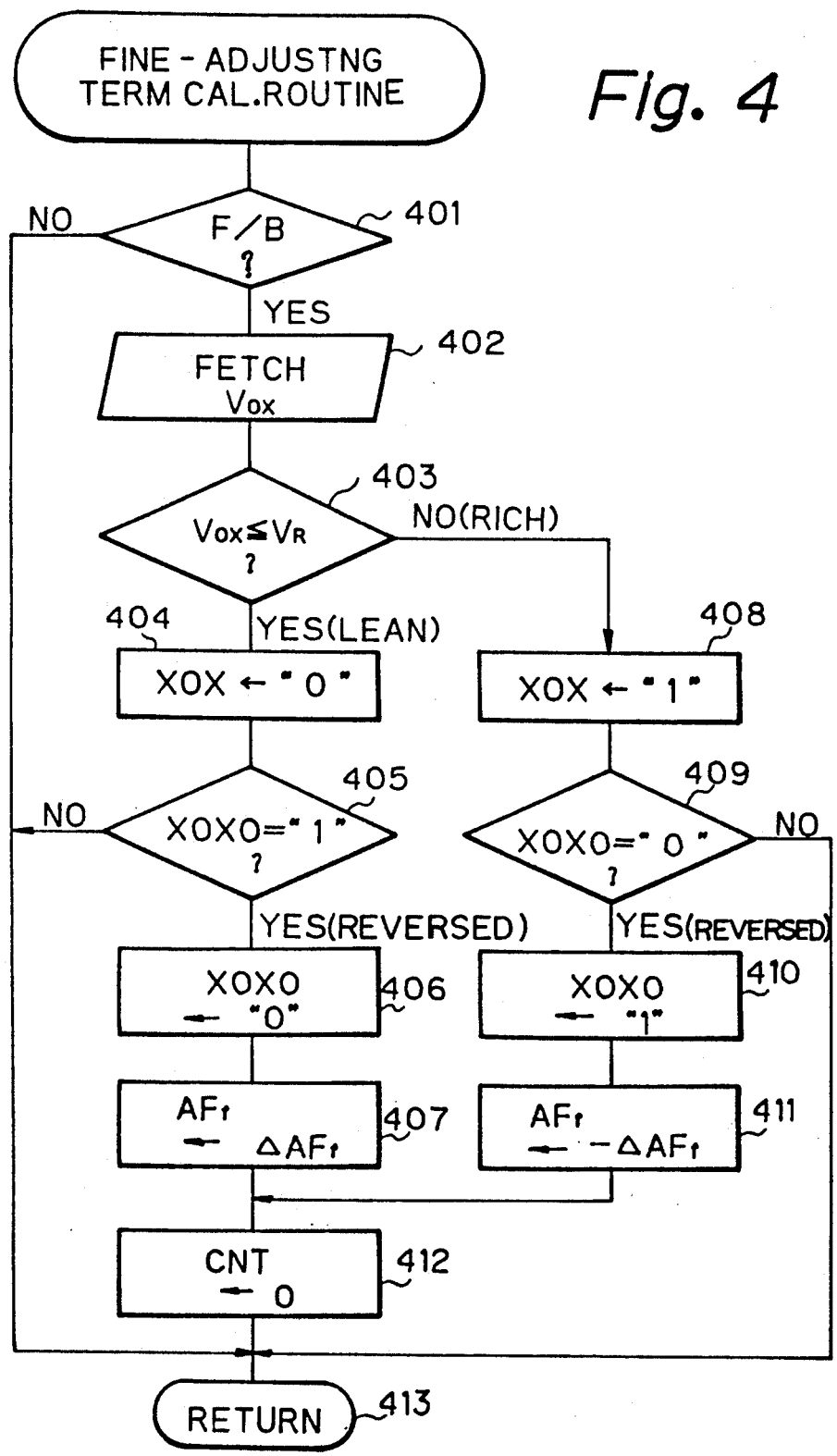

FIG. 4 is a routine for calculating a fine-adjusting term $AF_f$ in accordance with the output $V_{OX}$ of the $O_2$ sensor 14 executed at a predetermined time such as 4 ms.

At step 401, it is determined whether or not all of the feedback control (closed-loop control) conditions by the $O_2$ sensor 14 are satisfied. The feedback control conditions are as follows.

i) the coolant temperature THW is higher than 40° C.;
ii) the engine is not in a starting state;
iii) the engine is not in a fuel incremental state after a starting state;
iv) the engine is not in a warming-up state;
v) the power fuel incremental amount FPOWER is 0, i.e., the full switch VL of the throttle sensor 17 is turned OFF;
vi) the engine is not in a fuel cut-off state;
vii) the $O_2$ sensor 14 is in an activated state; and
viii) the secondary air-suction in accordance the output LL of the idle switch, and the coolant temperature THW, and the like is not carried out.

Note that the determination of activation/nonactivation of the $O_2$ sensor 14 is carried out by determining whether or not the output voltage $V_X$ of the $O_2$ sensor 14 is lower than a predetermined value. Of course, other feedback control conditions are introduced as occasion demands, but an explanation of such other feedback control conditions is omitted.

If one or more of the feedback control conditions is not satisfied, the control proceeds to step 413, to thereby carry out an open-loop control operation.

Contrary to the above, at step 401, if all of the feedback control conditions are satisfied, the control proceeds to step 402.

At step 402, an A/D conversion is performed upon the output voltage $V_{OX}$ of the $O_2$ sensor 14, and the A/D converted value thereof is then fetched from the A/D converter 101. Then at step 403, the voltage $V_{OX}$ is compared with a reference voltage $V_R$ such as 0.45 V, thereby determining whether the current air-fuel ratio detected by the $O_2$ sensor 14 is on the rich side or on the lean side with respect to the stoichiometric air-fuel ratio.

Figure 5:
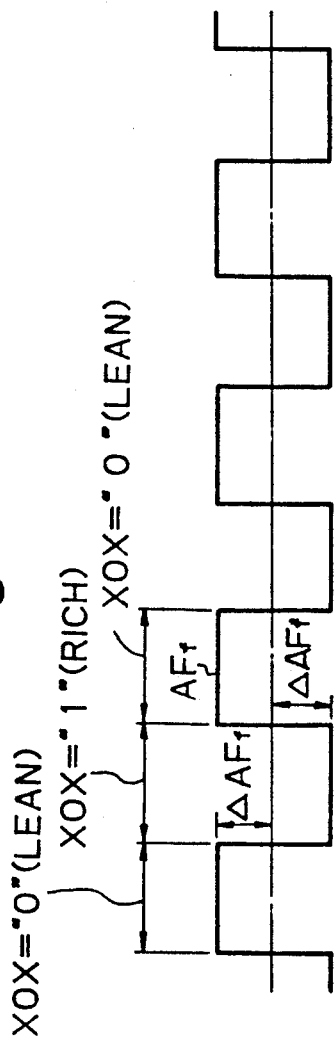
FIG. 5 is a timing diagram explaining the flow chart of FIG. 4.

If $V_{OX} \leq V_R$, which means that the current air-fuel ratio is lean, the control proceeds to step 404, which sets "0" in an air-fuel ratio flag XOX. At step 405, it is determined whether or not a previous air-fuel ratio flag XOXO is "1" (rich), i.e., the air-fuel ratio flag XOX is reversed. As a result, only when the air-fuel ratio flag XOX is reversed does the control proceed to step 406, which causes the fine-adjusting term $AF_f$ to be $\Delta AF_f$ (definite) as shown in FIG. 5. Then the control proceeds to step 412.

On the other hand, at step 403 if, $VA_{OX} > V_R$, which means that the current air-fuel ratio is rich, the control proceeds to step 408, which sets "1" in the air-fuel ratio flag XOX. At step 409, it is determined whether or not the previous air-fuel ratio flag XOXO is "0" (lean), i.e., the air-fuel ratio flag XOX is reversed. As a result, only when the air-fuel ratio flag XOX is reversed does the control proceed to step 410, which causes the fine-adjusting term $AF_f$ to be $-\Delta AF_f$ (definite) as shown in FIG. 5. Then the control proceeds to step 412.

At step 412, a counter value CNT is cleared. This counter value CNT is used for counting a reversion period of the output $V_{OX}$ of the $O_2$ sensor 14 in a routine of FIG. 6, which will be later explained.

Then, at step 413, the routine of FIG. 4 is completed.

Thus, according to the routine of FIG. 4, the fine-adjusting term $AF_f$ has a waveform which is skipped at every reversion of the output of the $O_2$ sensor 14 as shown in FIG. 5. Namely, the control of the fine-adjusting term $AF_f$ corresponds to a skip control, and thus, a self-oscillating waveform is formed by the output $V_{OX}$ of the $O_2$ sensor 14 per se.

Figure 6:
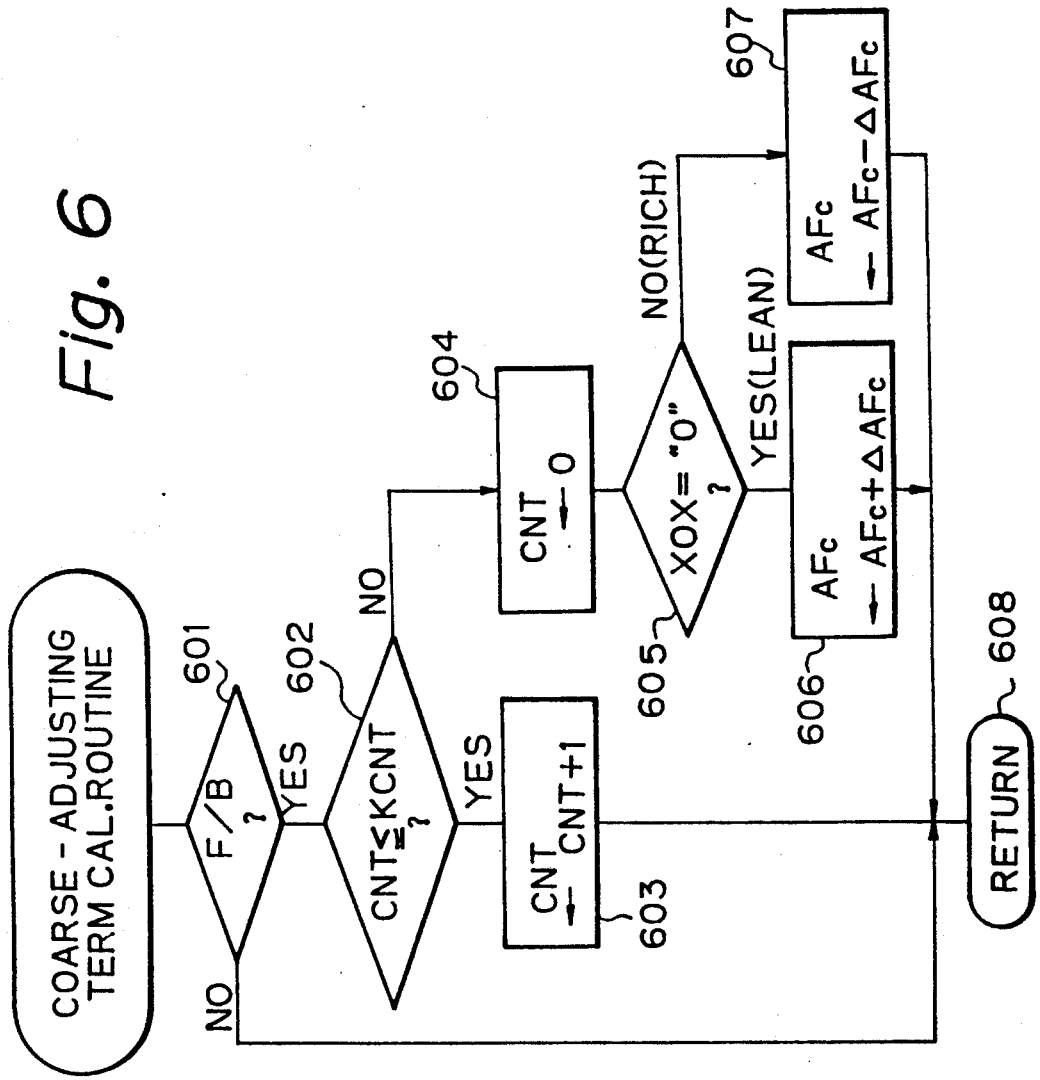

FIG. 6 is a routine for calculating a coarse-adjusting term $AF_c$ in accordance with the output $V_{OX}$ of the $O_2$ sensor 14 executed at a predetermined time such as 64 ms. At step 601, it is determined whether or not all of the feedback control conditions are satisfied, as at step 401 of FIG. 4. As a result, when one or more of the feedback control conditions are not satisfied, the control proceeds directly to step 608. When all of the feedback control conditions are satisfied, the control proceeds to step 602, which determines whether or not the counter value CNT has reached a definite value KCNT. Note that the counter value CNT is cleared at every reversion of the output $V_{OX}$ of the $O_2$ sensor 14, as explained above.

Therefore, first the control at step 602 proceeds to step 603, which increases the counter value CNT by +1, thus completing this routine at step 608. Finally, when the counter value CNT reaches the definite value KCNT, i.e., when a time of KCNT×64 ms has passed, the control proceeds to steps 604 through 607.

At step 604, the counter value CNT is cleared, and at step 605 it is determined whether or not XOX="0", i.e., whether the current air-fuel ratio downstream of the catalyst converter 12 is lean ("0") or rich ("1"). As a result, if lean ("1"), the control proceeds to step 606 which increases the coarse-adjusting term $AF_c$ by $\Delta AF_c$ (definite), and if rich ("1"), the control proceeds to step 607 which decreases the coarse-adjusting term $AF_c$ by $-\Delta AF_c$. Then the control proceeds to step 608.

Note that the definite value $\Delta AF_c$ is smaller than the skip amount $\Delta AF_f$ at steps 407 and 411 of FIG. 4, i.e., $$\Delta AF_c < \Delta AF_f$$

Figure 7:
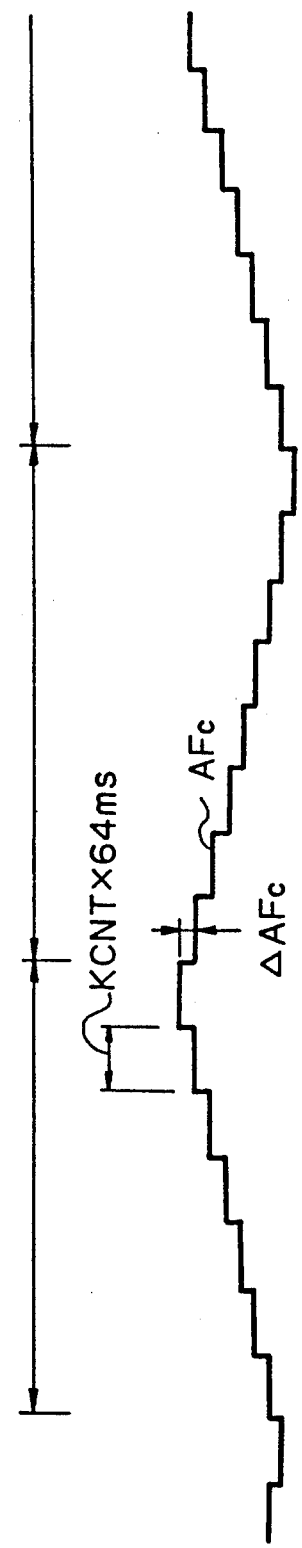
FIG. 7 is a timing diagram explaining the flow chart of FIG. 6.

Therefore, as shown in FIG. 7, when the air-fuel ratio downstream of the catalyst converter 12 is lean (XOX ="0"), the coarse-adjusting term AFc is gradually increased at a rate of $\Delta AF_c$, and when the air-fuel ratio downstream of the catalyst converter 12 is rich (XOX ="1"), the coarse-adjusting term $AF_c$ is gradually decreased at the rate of $\Delta AF_c$. Thus, the control of the coarse-adjusting term $AF_c$ corresponds to an integral control.

The substantial execution and non-execution of the routine of the coarse-adjusting term $AF_c$ is dependent upon the non-execution and execution of the routine of the fine-adjusting term $AF_f$, respectively. Namely, when the air-fuel ratio downstream of the catalyst converter 12 is shifted from the stoichiometric air-fuel ratio, $V_{OX} \leq V_R$ (lean) or $V_{OX} > V_R$ (rich) is retained, so that the fine-adjusting term $AF_f$ is retained at $\Delta AF_f$ or $-\Delta AF_f$ by the routine of FIG. 4. As a result, the counter value CNT is not cleared by step 412 of FIG. 4. In this case, the coarse-adjusting term $AF_c$ is increased or decreased at a time of KCNT×64 ms. Thus, the control of the coarse-adjusting term $AF_c$ has priority over the control of the fine-adjusting term $AF_f$.

Conversely, when the air-fuel ratio downstream of the catalyst converter 12 is converged into the stoichiometric air-fuel ratio, the output $V_{OX}$ of the $O_2$ sensor 14 is often reversed, i.e., the reversion period of the output $V_{OX}$ of the $O_2$ sensor 14 becomes short, thus frequently moving the fine-adjusting term $AF_f$ between $\Delta AF_f$ and $-\Delta AF_f$. In this case, the counter value CNT is cleared by step 412 of FIG. 4 before the counter value CNT reaches the definite value KCNT, and as a result, the control at step 602 of FIG. 6 always proceeds to step 603. Therefore, the coarse-adjusting term $AF_c$ is not increased or decreased, i.e., the calculation of the coarse-adjusting term $AF_c$ is prohibited and held at a specific value. Thus, the control of the fine-adjusting term $AF_f$ has priority over the control of the coarse-adjusting term $AF_c$.

Figure 8:
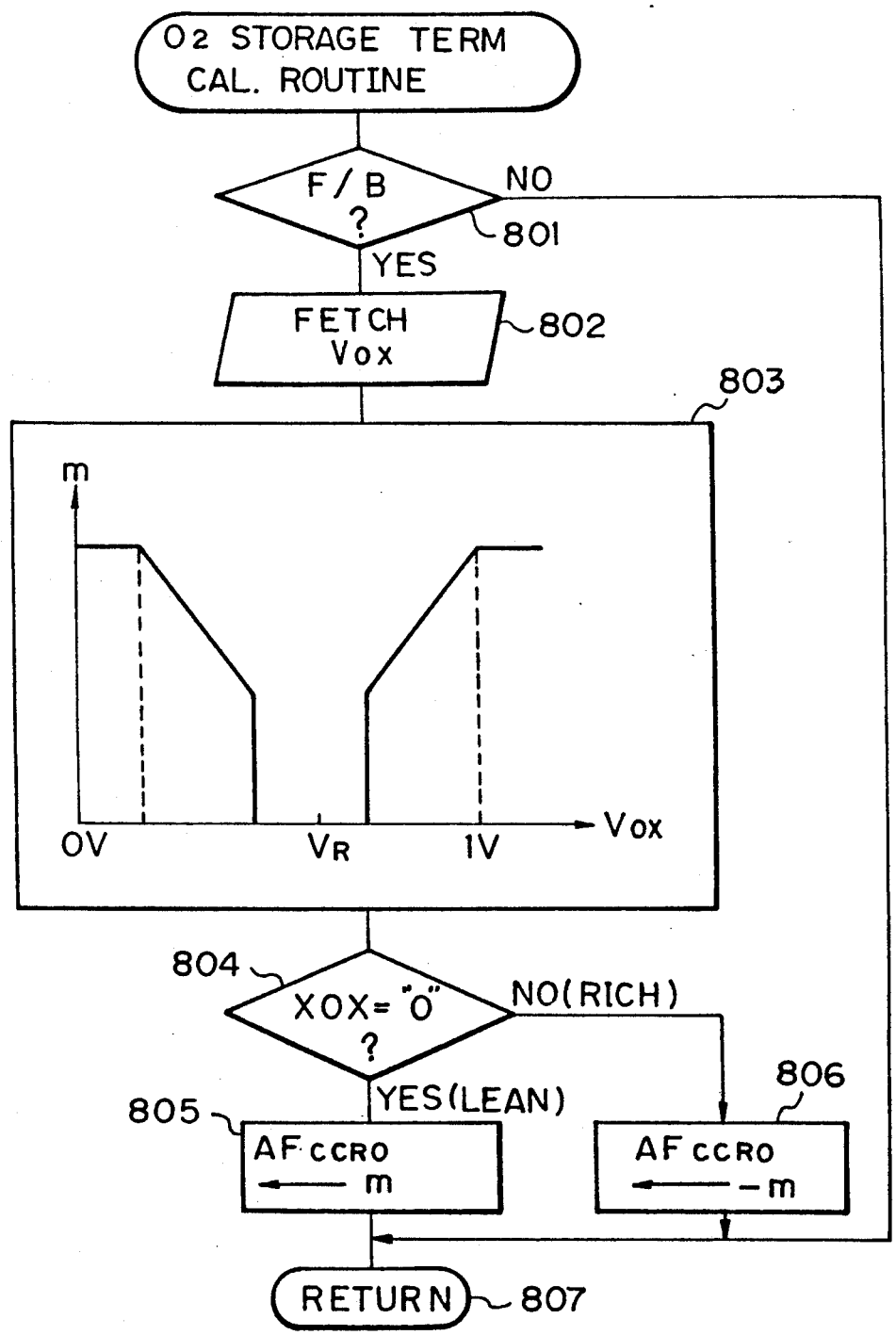

In FIG. 8, which is a routine for calculating an $O_2$ storage term $AF_{CCRO}$ executed at a predetermined time such as 16 ms, at step 801, it is determined whether or not all of the air-fuel ratio feedback conditions are satisfied in the same way as at step 401 of FIG. 4. Only when all the air-fuel ratio feedback conditions are satisfied does the control proceed to steps 802 through 806. At step 802, an A/D conversion is performed upon the output $V_{OX}$ of the $O_2$ sensor 14, and a value m is calculated from a one-dimensional map using the parameter $V_{OX}$ stored in the ROM 104. Note that the value m is larger when the output $V_{OX}$ of the $O_2$ sensor 14 is far from the reference voltage $V_R$ corresponding to the stoichiometric air-fuel ratio ($\lambda=1$). Also, the value m can be discretely changed in accordance with the output $V_{OX}$ of the $O_2$ sensor 14, and in this case, a calculation at step 803 can be attained by a simple comparison operation. Next, at step 804, it is determined whether or not the air-fuel ratio downstream of the catalyst converter 12 is on the lean side (XOX="0"). As a result, if on the lean side (XOX ="0"), the control proceeds to step 805 which causes the $O_2$ storage term to be m, and if on the rich side (XOX="1"), the control proceeds to step 806 which causes the $O_2$ storage term $AF_{CCRO}$ to be $-m$.

This routine of FIG. 8 is then completed by step 807.

Thus, since the $O_2$ sensor 14 is located downstream of the catalyst converter 12, the $O_2$ storage amount thereof can be monitored by the output $V_{OX}$ of the $O_2$ sensor 14, thus calculating the $O_2$ storage term $AF_{CCRO}$ in accordance with the output $V_{OX}$ of the $O_2$ sensor 14.

Figure 9:
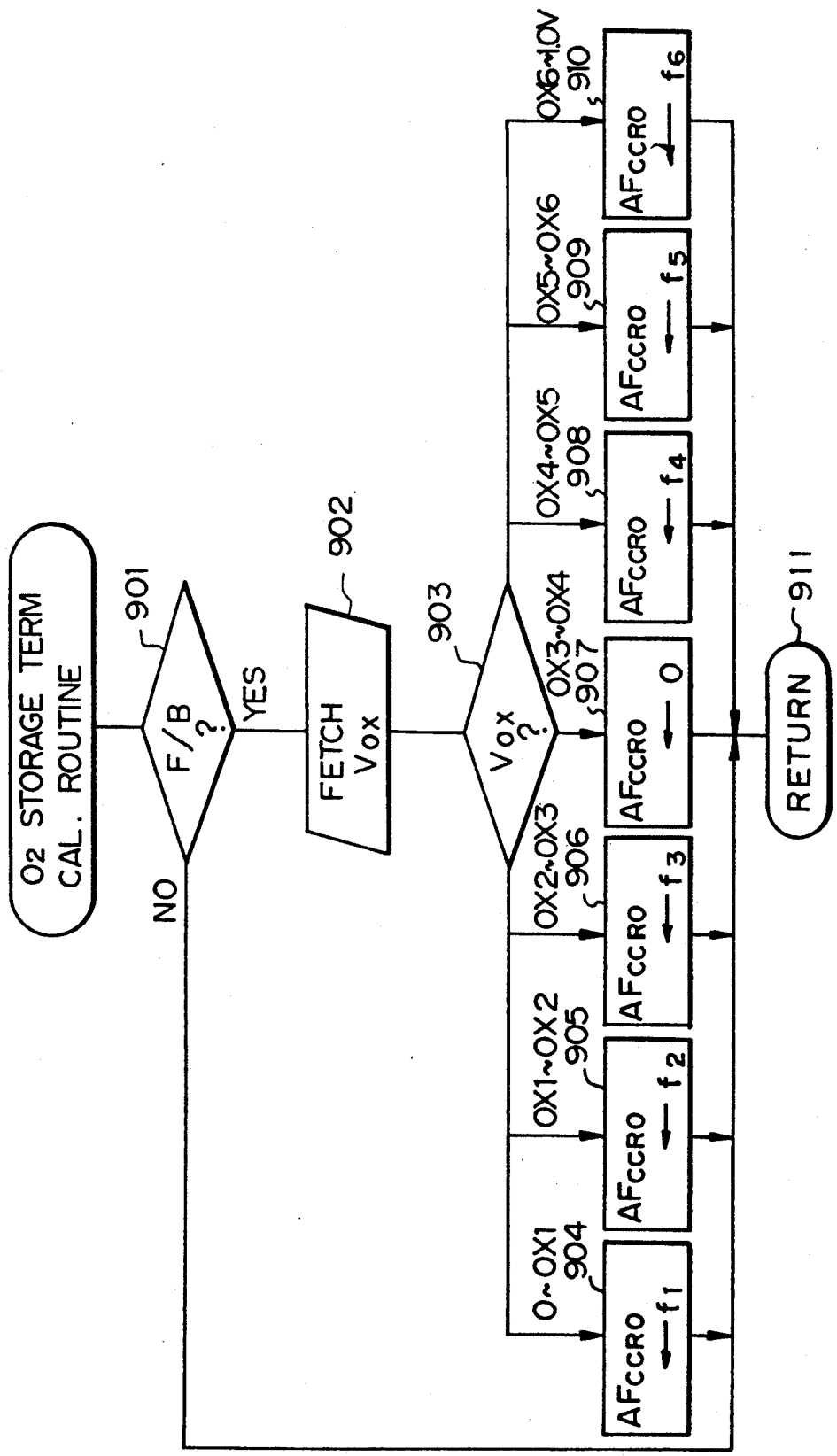
Figure 10:
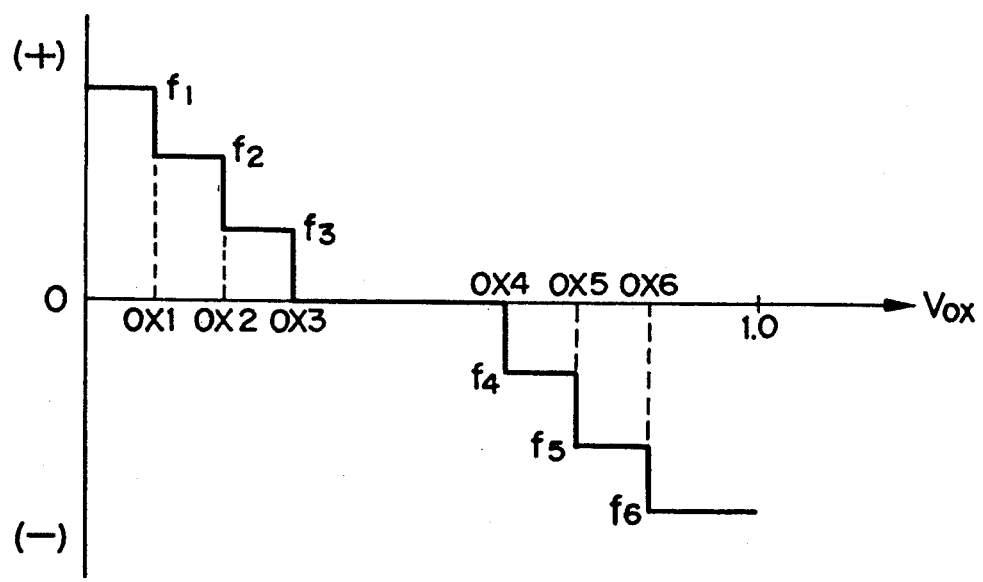
FIG. 10, is a timing diagram explaining the flow chart of FIG. 9.

In FIG. 9, which is another routine for calculating an $O_2$ storage term executed at a predetermined time such as 16 ms, at step 901 it is determined whether or not all of the air-fuel ratio feedback control conditions are satisfied, in the same way as at step 401 of FIG. 4. Only when all of the air-fuel ratio feedback conditions are satisfied does the control proceed to steps 902 through 910. At step 902, an A/D conversion is performed upon the output $V_{OX}$ of the $O_2$ sensor 14, and, at step 903 it is determined to what region the output $V_{OX}$ of the $O_2$ sensor 14 belongs. Namely, as shown in FIG. 10, a range of 0 to 1.0 V of the output $V_{OX}$ of the $O_2$ sensor 14 is divided into seven regions:

0V–OX1
OX1–OX2
OX2–OX3
OX3–OX4
OX4–OX5
OX5–OX6
OX6–1.0 V

As a result, when $0 \leq V_{OX} < OX1$, the control proceeds to step 904 which calculates the $O_2$ storage term $AF_{CCRO}$ by $$AF_{CCRO} \leftarrow f_1.$$

When $OX1 \leq V_{OX} < OX2$, the control proceeds to step 905 which calculates the $O_2$ storage term $AF_{CCRO}$ by $$AF_{CCRO} \leftarrow f_2.$$

$OX2 \leq V_{OX} < OX3$, the control proceeds to step 906 which calculates the $O_2$ storage term $AF_{CCRO}$ by $$AF_{CCRO}. f_3.$$

$OX3 \leq V_{OX} < OX4$, the control proceeds to step 907 which calculates the $O_2$ storage term $AF_{CCRO}$ by $$AF_{CCRO} \leftarrow 0.$$

$OX4 \leq V_{OX} < OX5$, the control proceeds to step 908 which calculates the O₂ storage term $AF_{CCRO}$ by $$AF_{CCRO} \leftarrow f_4.$$

$OX5 \leq V_{OX} < OX6$, the control proceeds to step 909 which calculates the O₂ storage term $AF_{CCRO}$ by $$AF_{CCRO} \leftarrow f_5.$$

$OX6 \leq V_{OX} < 1.0$ V, the control proceeds to step 910 which calculates the O₂ storage term $AF_{CCRO}$ by $$AF_{CCRO} \leftarrow f_6.$$

Then, the routine of FIG. 9 is completed by step 911.

Thus, the O₂ storage term $AF_{CCRO}$ is also calculated in accordance with the output $V_{OX}$ of the O₂ sensor 14, by the routine of FIG. 9.

Figure 11:
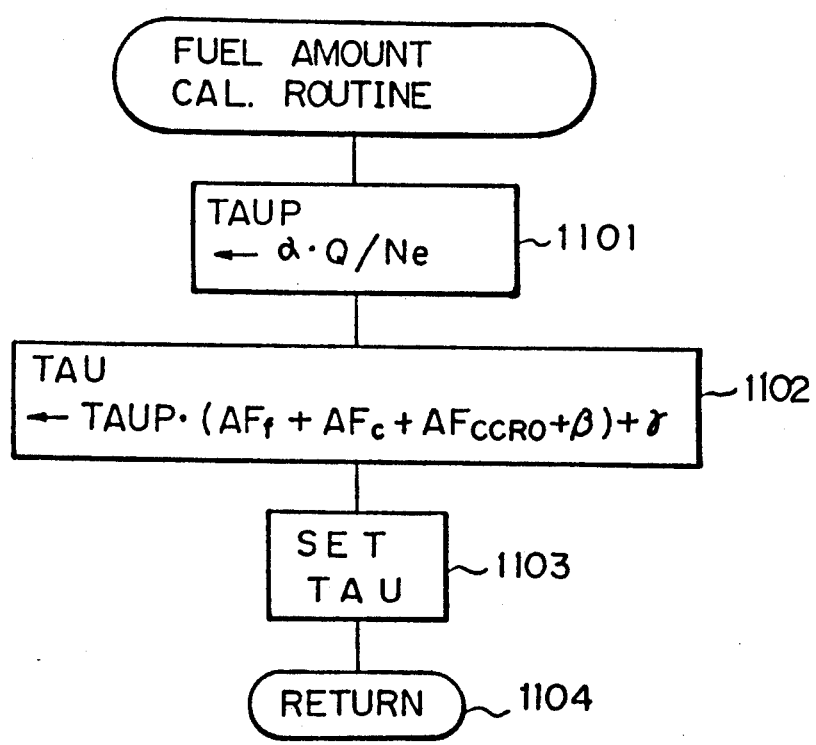

FIG. 11 is a routine for calculating a fuel injection amount TAU executed at a predetermined crank angle such as 360° CA.

At step 1101, a base fuel injection amount TAUP is calculated by using the intake air amount data Q and the engine speed data $N_e$ stored in the RAM 105. That is TAUP $\leftarrow \alpha \cdot Q/N_e$ where $\alpha$ is a constant. At step 1102, a final fuel injection amount TAU is calculated by $$TAU \leftarrow TAUP \cdot (AF_f + AF_c + AF_{CCRO} + \beta) + \gamma$$

where $\beta$ and $\gamma$ are correction factors determined by other parameters such as the voltage of the battery and the temperature of the intake air. At step 1103, the final fuel injection amount TAU is set in the down counter 107, and in addition, the flip-flop 108 is set to initiate the activation of the fuel injection valve 7. This routine is completed by step 1104. Note that, as explained above, when a time corresponding to the amount TAU has passed, the flip-flop 109 is reset by the borrow-out signal of the down counter 108 to stop the activation of the fuel injection valve 7.

Thus, even when the O₂ sensor is located downstream of the catalyst converter 12, the frequency of the controlled air-fuel ratio can be maintained at a large value, to exhibit an excellent cleaning-up effect of the catalyst converter 12, and a target air-fuel ratio, i.e., the stoichiometric air-fuel ratio, can be obtained.

Figure 12A:
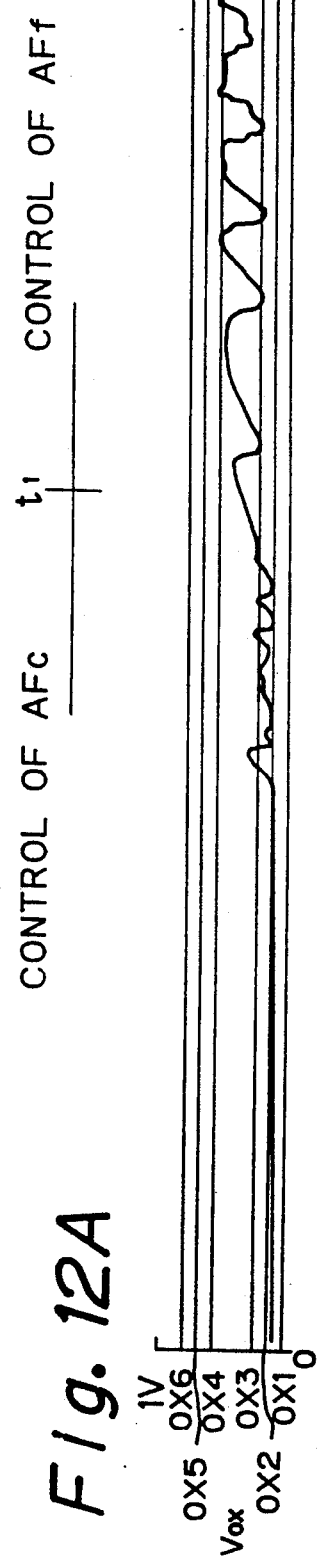
FIGS. 12A, and 12B are timing diagrams explaining the flow charts of FIGS. 4, 6, 9, and 11.
Figure 12B:
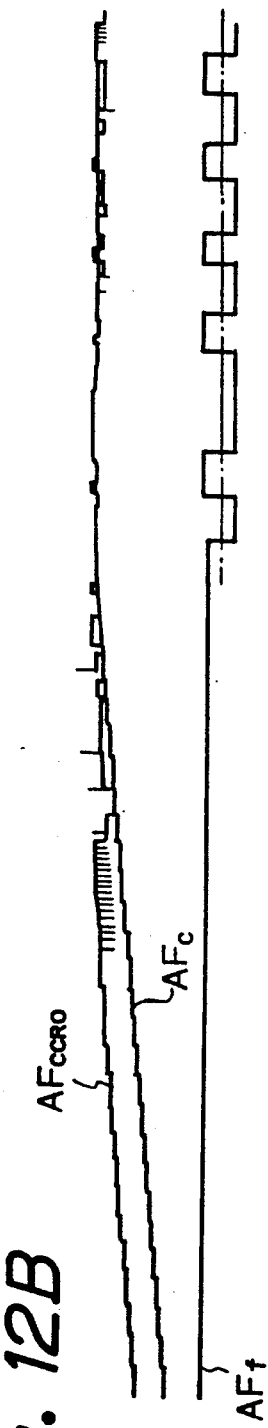

The routines of FIGS. 4, 6, 9, and 11 will be further explained with reference to FIGS. 12A, and 12B. As shown in FIG. 12A, before time $t_1$, since the air-fuel ratio is greatly deviated to the lean side ($V_{OX} < V_R$), the coarse-adjusting term $AF_c$ is controlled as shown in FIG. 12B, so that the controlled air-fuel ratio is converged to the stoichiometric air-fuel ratio. Namely, this time is an integration time. Also, during this integration time, since the O₂ storage term $AF_{CCRO}$ is calculated in accordance with the O₂ storage amount stored in the catalyst converter 12 ($0 \leq V_{OX} < OX3$), to increase the O₂ storage term $AF_{CCRO}$, the convergence of the controlled air-fuel ratio to the stoichiometric air-fuel ratio is further improved. In this case, when the controlled air fuel ratio is close to the stoichiometric air-fuel ratio ($V_{OX} \approx OX3$), the controlled air-fuel ratio is reversed to the rich side and the O₂ storage term $AF_{CCRO}$ is made 0. As a result, at time $t_1$ when the air-fuel ratio is completely converged to the stoichiometric air-fuel ratio, the output of the O₂ sensor 14 frequently crosses the reference voltage $V_R$, i.e., the reversion period of the output of the $V_{OX}$ of the O₂ sensor 14 is relatively small.

As a result, the control of the coarse-adjusting term $AF_c$ is prohibited, and it is held at the value as shown in FIG. 12B. Thus an overcorrection of the air-fuel ratio due to the delay of the output $V_{OX}$ of the O₂ sensor 14 is avoided, to thereby improve the convergence of the controlled air fuel ratio.

In FIGS. 12A and 12B, it is assumed that the air-fuel ratio is greatly deviated to the lean side before time $t_1$, but a similar phenomenon occurs when the air-fuel ratio is greatly deviated to the rich side.

Thus, the convergence of the controlled air-fuel ratio to the stoichiometric air-fuel ratio is improved by the O₂ storage term $AF_{CCRO}$.

Figure 13:
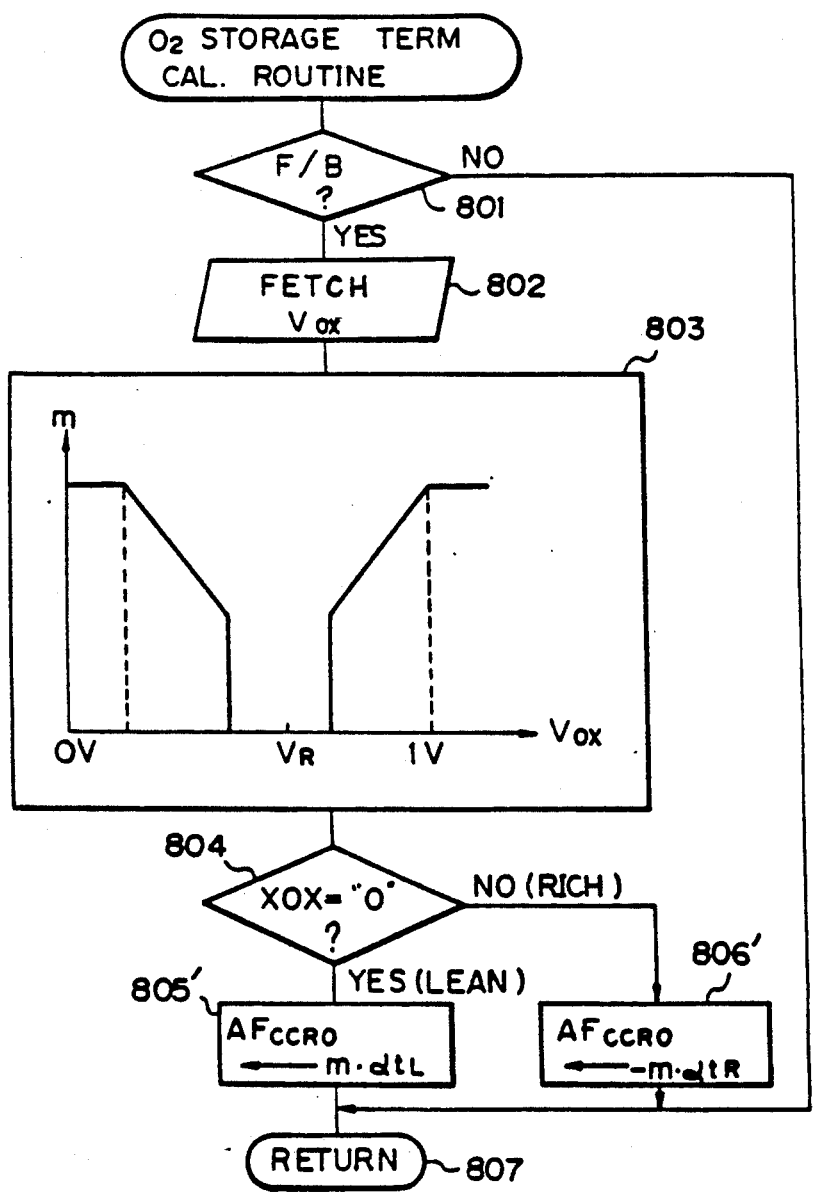

In FIG. 13, which is a modification of FIG. 8, steps 805' and 806' are provided instead of steps 805 and 806 of FIG. 8. Namely, at steps 805' and 806', the O₂ storage term $AF_{CCRO}$ is calculated by $$AF_{CCRO} \leftarrow m \cdot \alpha_{tL}$$

$$AF_{CCRO} \leftarrow -m \cdot \alpha_{tR}$$

where $\alpha_{tL}$ is a lean duration of the output $V_{OX}$ of the O₂ sensor 14, and $\alpha_{tR}$ is a rich duration of the output $V_{OX}$ of the O₂ sensor 14. That is, even when the output $V_{OX}$ of the O₂ sensor 14 remains at the same level, a longer duration of the output $V_{OX}$ of the O₂ sensor 14 at the same level creates a greater O₂ storage effect, thus increasing the O₂ storage term $AF_{CCRO}$.

Figure 14:
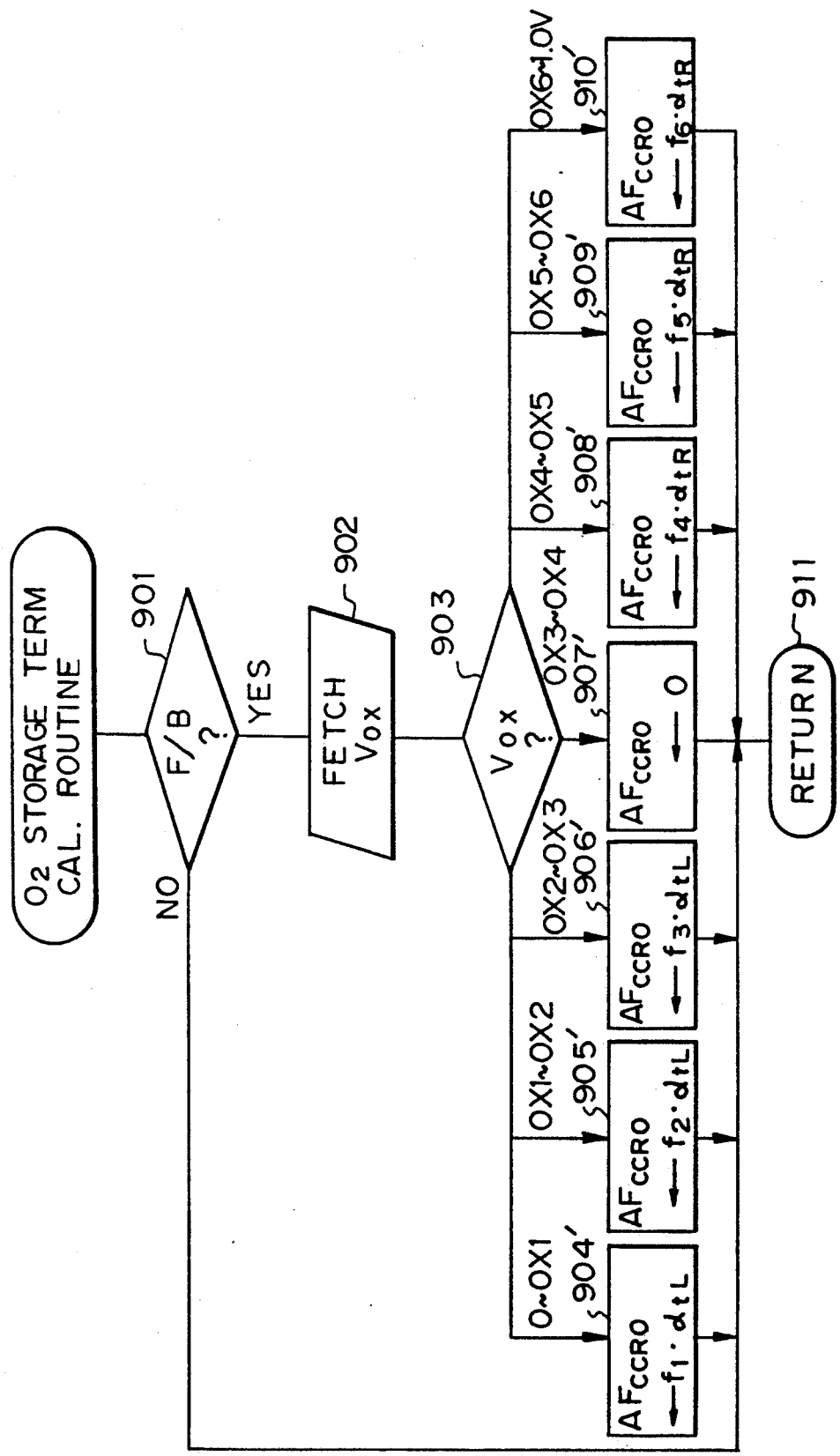

In FIG. 14, which is a modification of FIG. 9, steps 904' through 910' are provided instead of steps 904 through 910 of FIG. 9. Namely, at steps 904' to 906', the O₂ storage term $AF_{CCRO}$ is calculated by $$AF_{CCRO} \leftarrow f_i \cdot \alpha_{tL} \ (i=1\text{-}3)$$

where $\alpha_{tL}$ is a lean duration of the output $V_{OX}$ of the O₂ sensor 14, and at steps 908' to 910', the O₂ storage term $AF_{CCRO}$ is calculated by $$AF_{CCRO} \leftarrow f_i \cdot \alpha_{tR}$$

where $\alpha_{tR}$ is a rich duration of the output of the O₂ sensor 14. That is, in the same was as in the routine of FIG. 13, even when the output $V_{OX}$ of the O₂ sensor 14 remains at the same level, a longer duration of the output $V_{OX}$ of the O₂ sensor 14 at the same level creates a greater O₂ storage effect, thus increasing the O₂ storage term $AF_{CCRO}$.

Figure 15B:
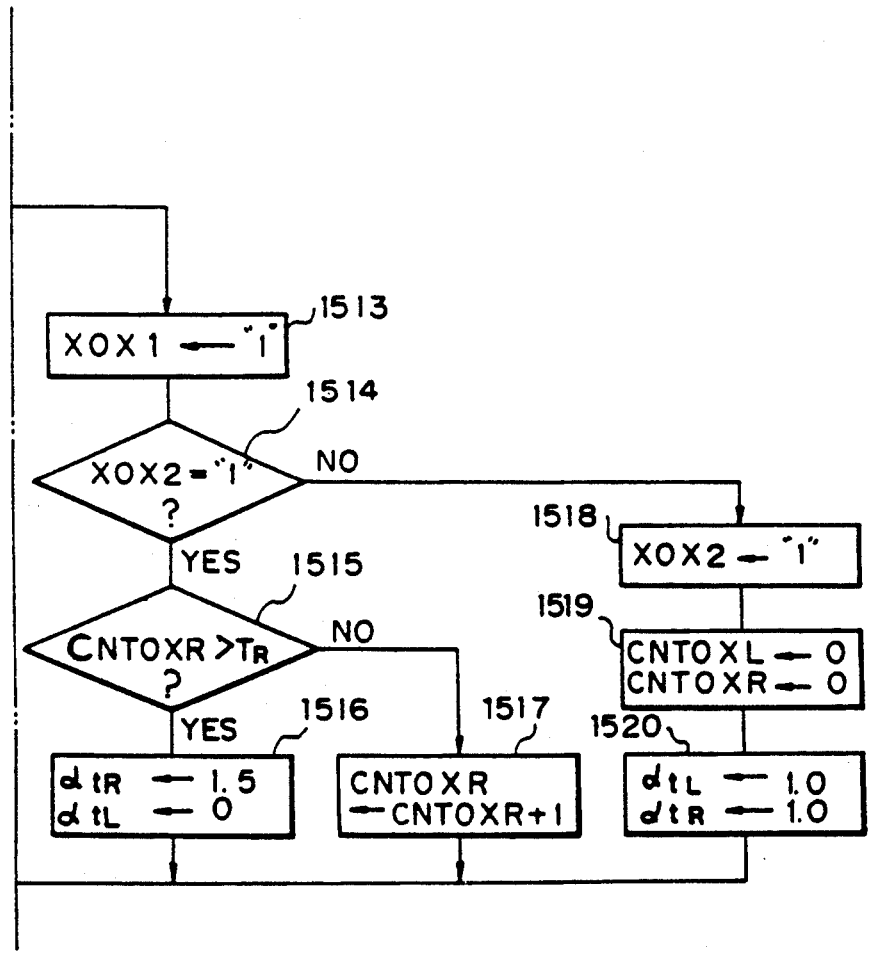

The lean duration $\alpha_{tL}$ and the rich duration $\alpha_{tR}$ of FIGS. 13 and 14 are calculated by a routine as illustrated in FIG. 15, executed at a predetermined time such as 512 ms. At step 1501, it is determined whether or not all of the air-fuel ratio feedback conditions are satisfied, in the same way as at step 401 of FIG. 4, and at step 1502 it is determined whether or not the engine is in an idling state (LL="1"). As a result, only when all of the air-fuel ratio feedback conditions are satisfied, and the engine is not in an idling state (LL ="0"), does the control proceed to steps 1503 through 1520.

At step 1503, an A/D conversion is performed upon the output $V_{OX}$ of the O₂ sensor 14, and at step 1504, it is determined whether or not $V_{OX} \leq V_R$ (lean) is satisfied. As a result, when $V_{OX} \leq V_R$ (lean), the control proceeds to step 1505, and when $V_{OX} > V_R$ (rich), the control proceeds to step 1513.

At step 1505, an air-fuel ratio flag XOX1 is made "0" (lean), and at step 1506, it is determined whether or not a previous air-fuel ratio flag XOX2 of the air-fuel ratio flag XOX1 is "0" (lean). As a result, when a lean air-fuel ratio state continues (XOX1=XOX2 ="0"), the control proceeds to step 1507 which determines whether or not a lean duration counter value CNTOXL exceeds a predetermined value $T_L$. Then, when CNTOXL>$T_L$, the control proceeds to step 1508 wherein:

$$\alpha_{iL} \leftarrow 1.5$$

$$\alpha_{iR} \leftarrow 0$$

Otherwise, the control proceeds to step 1509 which counts up the lean duration counter CNTOXL by +1. On the other hand, if a reversion occurs in the air-fuel ratio flags XOX1 and XOX2 at step 1506, the control proceeds to step 1510 which makes the previous air-fuel ratio flag XOX2 "0" (lean). Then, at step 1511, the counter values CNTOXL and CNTOXR are cleared, and at step 1512, the values $\alpha_{iL}$ and $\alpha_{iR}$ are determined by $$\alpha_{iL} \leftarrow 1.0$$

$$\alpha_{iR} \leftarrow 1.0.$$

Similarly, at step 1513, the air-fuel ratio flag XOX1 is made "1" (rich), and at step 1514, it is determined whether or not the previous air-fuel ratio flag XOX2 is "1" (rich). As a result, when a rich air-fuel ratio state continues (XOX1=XOX2="1"), the control proceeds to step 1515 which determines whether or not a rich duration counter value CNTOXR exceeds a predetermined value $T_R$. Then, when CNTOXR>$T_R$, the control proceeds to step 1516 wherein:

$$\alpha_{iR} \leftarrow 1.5$$

$$\alpha_{iL} \leftarrow 0$$

Otherwise, the control proceeds to step 1517 which counts up the rich duration counter CNTOXR by +1. On the other hand, if a reversion occurs in the air-fuel ratio flags XOX1 and XOX2 at step 1514, the control proceeds to step 1518 which makes the previous air-fuel ratio flag XOX2 "1" (rich). Then, at step 1519, the counter values CNTOXL and CNTOXR are cleared, and at step 1520, the values $\alpha_{iL}$ and $\alpha_{iR}$ are determined by $$\alpha_{iL} \leftarrow 1.0$$

$$\alpha_{iR} \leftarrow 1.0.$$

Then, this routine is completed by step 1521.

Thus, when the lean duration defined by CNTOXL is large, the coefficient $\alpha_{iL}$ is made large, and when the rich duration defined by CNTOXR is large, the coefficient $\alpha_{iR}$ is made large.

Figure 16:
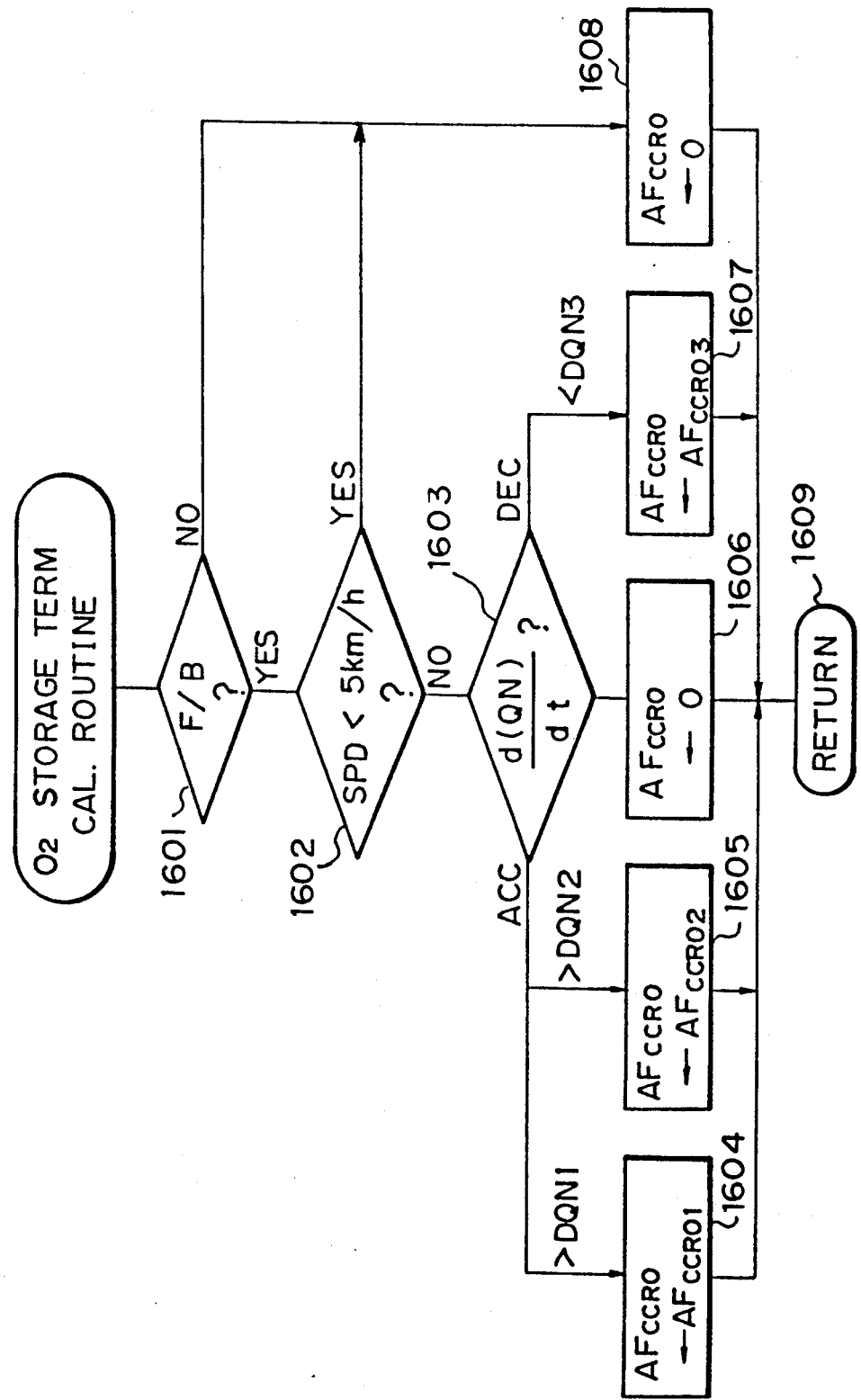

In FIG. 16, which is also a routine for calculating an $O_2$ storage term $AF_{CCRO}$ executed at a predetermined time such as 16 ms, at step 1601, it is determined whether or not all of the air-fuel ratio feedback control conditions are satisfied, in the same way as at step 401 of FIG. 4. As a result, when one or more of the air-fuel ratio feedback conditions are not satisfied, the control proceeds to step 1608 which makes the $O_2$ storage term $AF_{CCRO}$ "0", and if all of the air-fuel ratio feedback conditions are satisfied, the control proceeds to step 1602. At step 1602, the vehicle speed data SPD is fetched from the vehicle speed forming circuit 111, and it is determined whether or not SPD is lower than a predetermined value such as 5 km/h. As a result, when the vehicle speed SPD is lower than 5 km/h, the control also proceeds to step 1608 which makes the $O_2$ storage term $AF_{CCRO}$ "0". Otherwise, the control proceeds to step 1603 which calculates an intake air amount QN per one engine revolution by $$QN \leftarrow Q/Ne$$

Also, a change of QN is calculated by $$\frac{d(QN)}{dt} \leftarrow QN - QNO$$

where QNO is a previous value of QN. Then, a large acceleration state, a small acceleration state, and a deceleration state are determined in accordance with d(QN)/dt. As a result, when d(QN)/dt>DQN1 (large acceleration state), the control proceeds to step 1604, which causes the $O_2$ storage term $AF_{CCRO}$ to be $AF_{CCRO1}$ (>0). Also, when d(QN)/dt>DQN2 (small acceleration state), the control proceeds to step 1605 which causes the $O_2$ storage term $AF_{CCRO}$ to be $AF_{CCRO2}$ (0<$AF_{CCRO2}$<$AF_{CCRO1}$). Further, when d(QN)/dt<DQN3 (deceleration state), the control proceeds to step 1607 which causes the $O_2$ storage term $AF_{CCRO}$ to be $AF_{CCRO3}$ (<0), and in a steady state (DQN3≦d(QN)≦DQN2), the control proceeds to step 1606 which causes the $O_2$ storage term $AF_{CCRO}$ to be 0.

Then, the routine of FIG. 16 is completed by step 1609.

That is, when the acceleration rate of the engine is large, the air-fuel ratio upstream of the catalyst converter 12 is greatly deviated to the rich side, to change the $O_2$ storage amount of the catalyst converter 12. Therefore, if the relationship between the $O_2$ storage amount of the catalyst converter 12 and the value d(QN)/dt is recognized in advance, the $O_2$ storage amount is monitored by the value d(QN)/dt, to calculate the $O_2$ storage term $AF_{CCRO}$ in accordance with the value d(QN)/dt.

Figure 17:
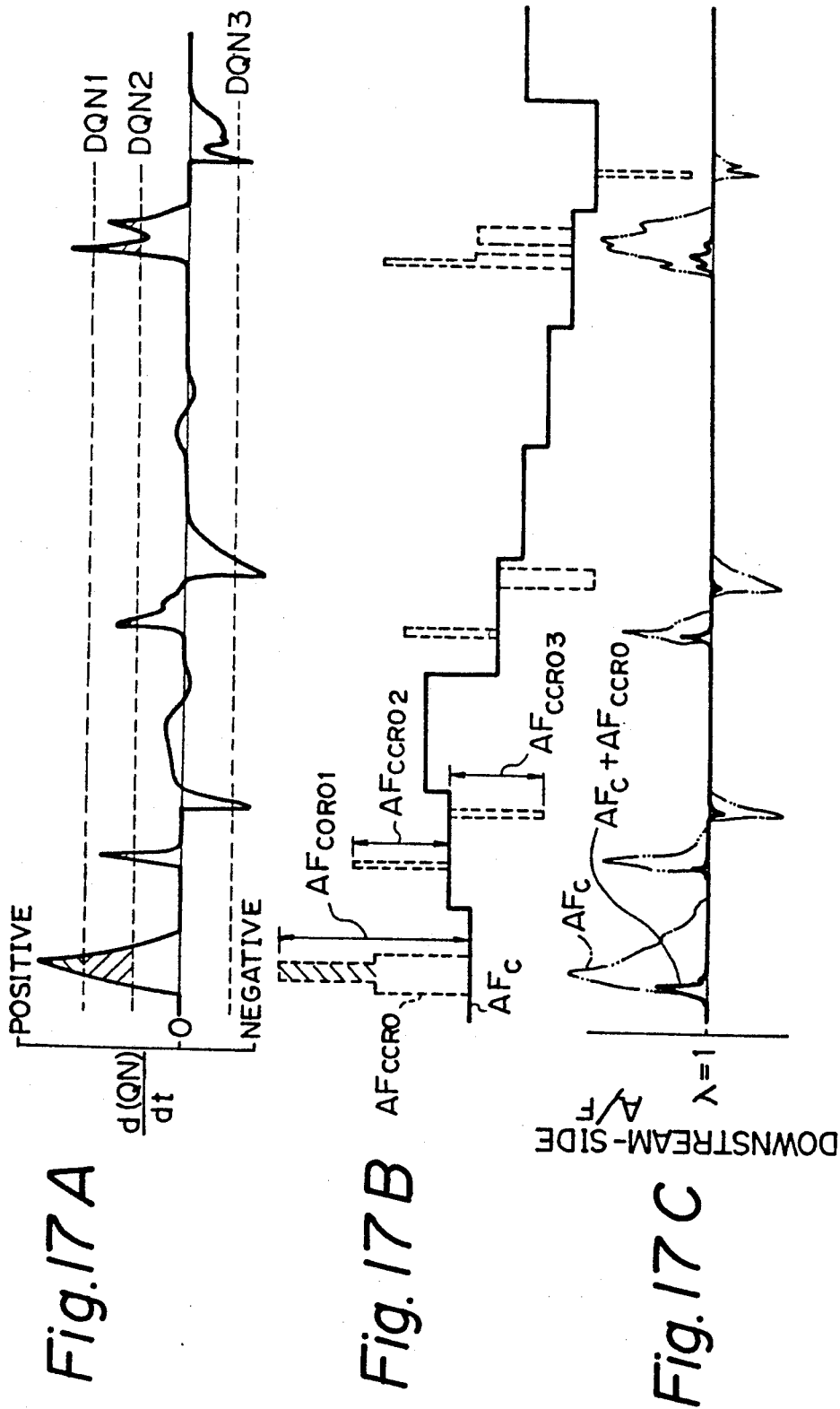
FIGS. 17A, 17B, and 17C, are timing diagrams explaining the flow charts of FIGS. 4, 11, and 16.

The routines of FIGS. 4, 6, 11, and 15 will be explained with reference to FIGS. 17A, 17B, 17C. That is, a sum of the fine-adjusting term $AF_f$ and the $O_2$ storage term $AF_{CCRO}$ serves as the fine-adjusting term $AF_f$ of FIG. 12B. Therefore, even when the $O_2$ storage effect of the catalyst converter 12 is changed by a transient state such as an acceleration state or a deceleration state, an asynchronous fuel increment, a change of shift, deposit at intake valves, a delay in detection of the intake air amount, or the like, the delay of control of the air-fuel ratio is compensated, thus improving the convergence of the air-fuel ratio downstream of the catalyst converter 12, to reduce the emissions.

Also, in the above-mentioned embodiments, although the fine-adjusting term $AF_f$ is introduced into the control of the air-fuel ratio, it is possible to control the air-fuel ratio by only the coarse-adjusting term $AF_c$ and the $O_2$ storage term $AF_{CCRO}$. In this case, when the controlled air-fuel ratio is greatly deviated from the stoichiometric air-fuel ratio, the $O_2$ storage term $AF_{CCRO}$ serves as the fine-adjusting term $AF_f$.

Figure 18:
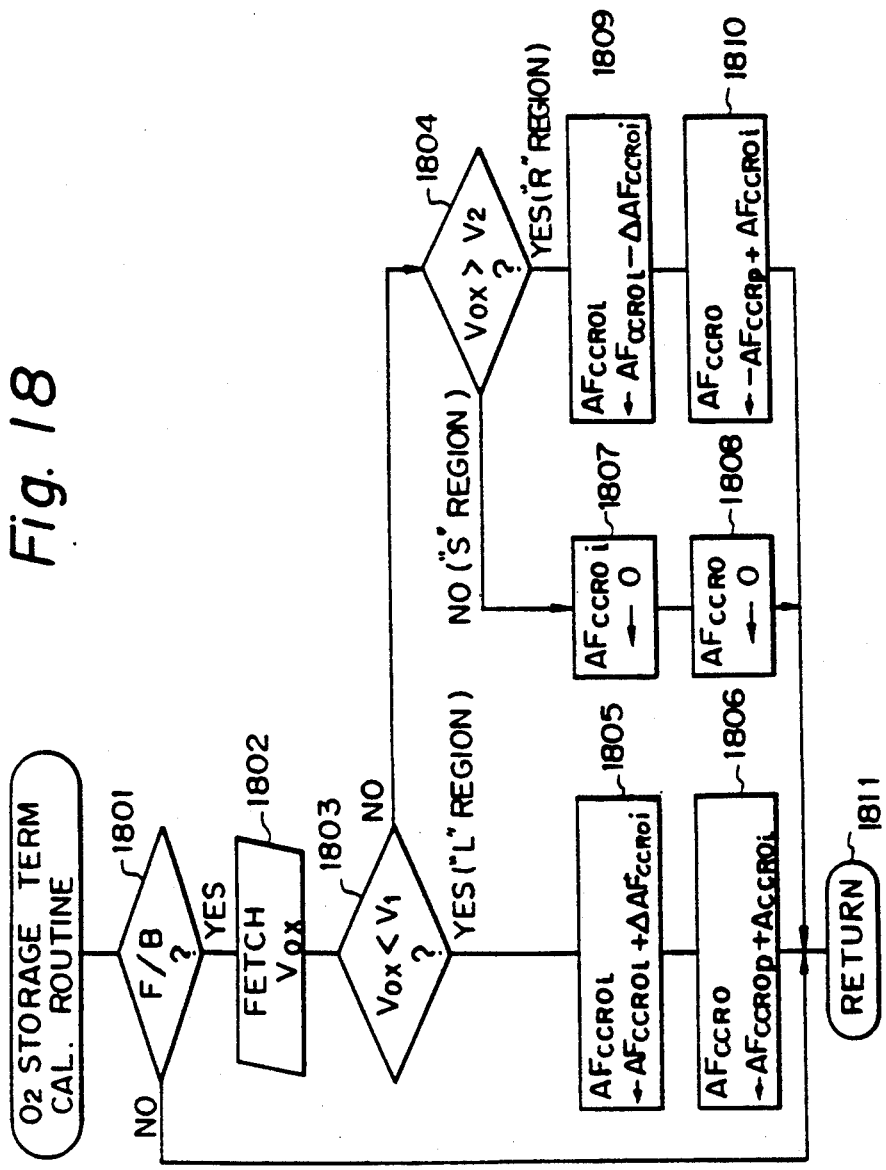

In FIG. 18, which is a further routine for calculating an $O_2$ storage term $AF_{CCRO}$ executed at a predetermined time such as 16 ms, at step 1801 it is determined whether or not all of the air-fuel ratio feedback control conditions are satisfied, in the same way as at step 401 of FIG. 4. As a result, when one or more of the air-fuel ratio feedback conditions are not satisfied, the control proceeds directly to step 1811. Otherwise, the control proceeds to steps 1802 through 1810.

Figure 19:
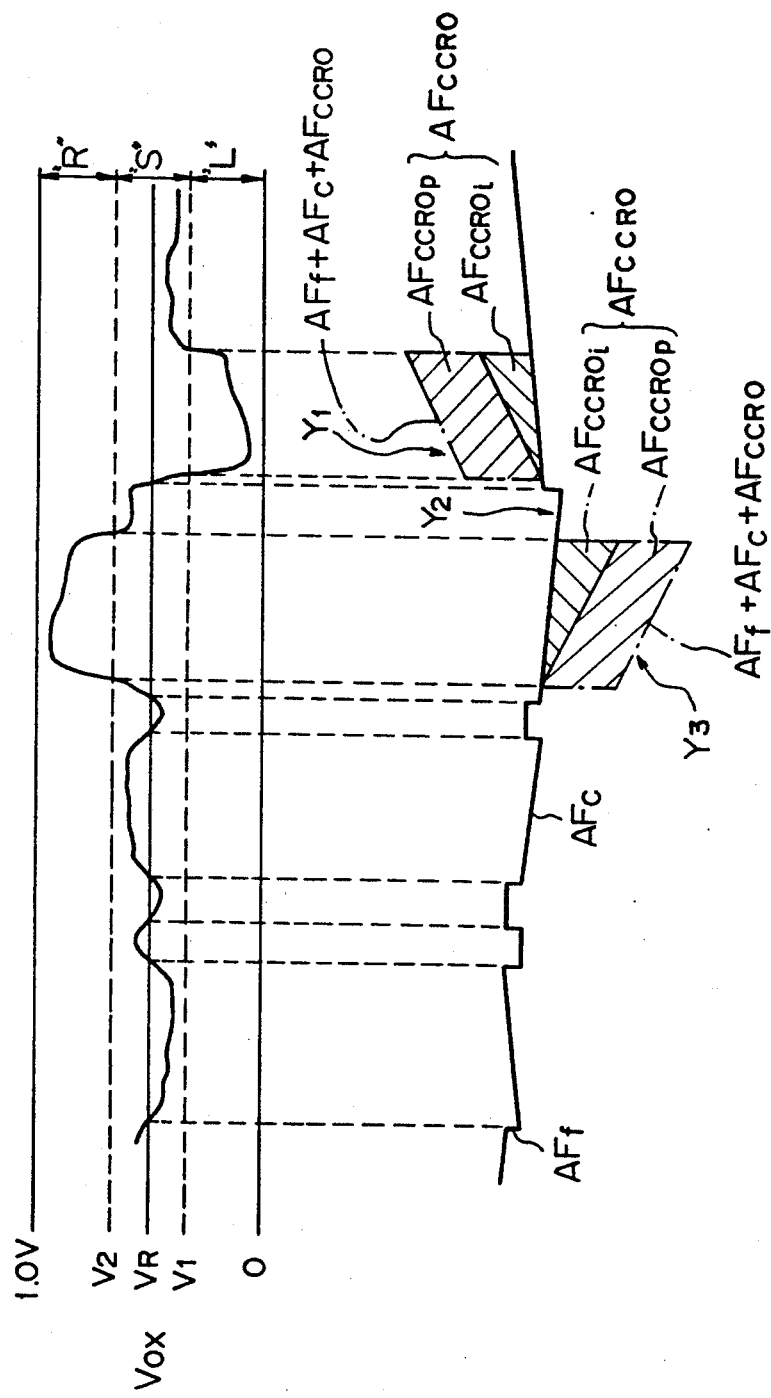
FIGS. 19A and 19B are timing diagrams explaining the flow chart of FIG. 18.

At step 1802, an A/D conversion is performed upon the output $V_{OX}$ of the $O_2$ sensor 14. Then, at step 1803, it is determined whether or not $V_{OX} < V_1$ is satisfied, and at step 1804, it is determined whether or not $V_{OX} > V_2$ is satisfied. Note, a range of 0 V to 1.0 V of the output $V_{OX}$ of the $O_2$ sensor 14 is divided into three regions as shown in FIG. 19A:

"L" (lean) region: $0V \sim V_1$
"S" (stoichiometric) region: $V_1 \sim V_2$
"R" (rich) region: $V_2 \sim 1.0V$ As a result, when $0V \leq V_{OX} < V_1$ ("L" region), the control proceeds to step 1805 which gradually increases an integral $O_2$ storage amount $AF_{CCROi}$ by $$AF_{CCROi} \leftarrow AF_{CCROi} + \Delta AF_{CCROi} \text{ (definite)}.$$

Then, at step 1806, the $O_2$ storage term $AF_{CCRO}$ is calculated by $$AF_{CCRO} \leftarrow AF_{CCROP} + AF_{CCROi}$$

where $AF_{CCROP}$ is a skip $O_2$ storage term which is definite and satisfies

Namely, when the output $V_{OX}$ of the $O_2$ sensor 14 is in the "L" region, the value of $AF_f + AF_c + AF_{CCRO}$ is shifted by $AF_{CCROP}$, and thereafter, is gradually increased by $\Delta AF_{CCRO}$, as indicated by $Y_1$ in FIG. 19B.

Also, when the output $V_{OX}$ of the $O_2$ sensor 14 is in the "S" region, the control proceeds to step 1807 which clears the integral $O_2$ storage term $AF_{CCROi}$, and then, at step 1808, the $O_2$ storage term $AF_{CCRO}$ is cleared.

That is, when the output $V_{OX}$ of the $O_2$ sensor 14 is in the "S" region, the value of $AF_f + AF_c + AF_{CCRO}$ is defined by $AF_f + AF_c$, as indicated by $Y_2$ in FIG. 19B. Further, when $V_2 < V_{OX} \leq 1.0$ V ("R" region), the control proceeds to step 1809 which gradually decreases the integral $O_2$ storage amount by $$AF_{CCROi} \leftarrow AF_{CCROi} - \Delta AF_{CCROi}.$$

Then, at step 1810, the $O_2$ storage term $AF_{CCRO}$ is calculated by $$AF_{CCRO} \leftarrow -AF_{CCROP} + AF_{CCROi}.$$

That is, when the output $V_{OX}$ of the $O_2$ sensor 14 is in the "R" region, the value of $AF_f + AF_c + AF_{CCRO}$ is shifted by $-AF_{CCROP}$, and thereafter, is gradually decreased by $\Delta AF_{CCRO}$, as indicated by $Y_3$ in FIG. 19B.

Then, the routine of FIG. 18 is completed by step 1811.

Figure 20:
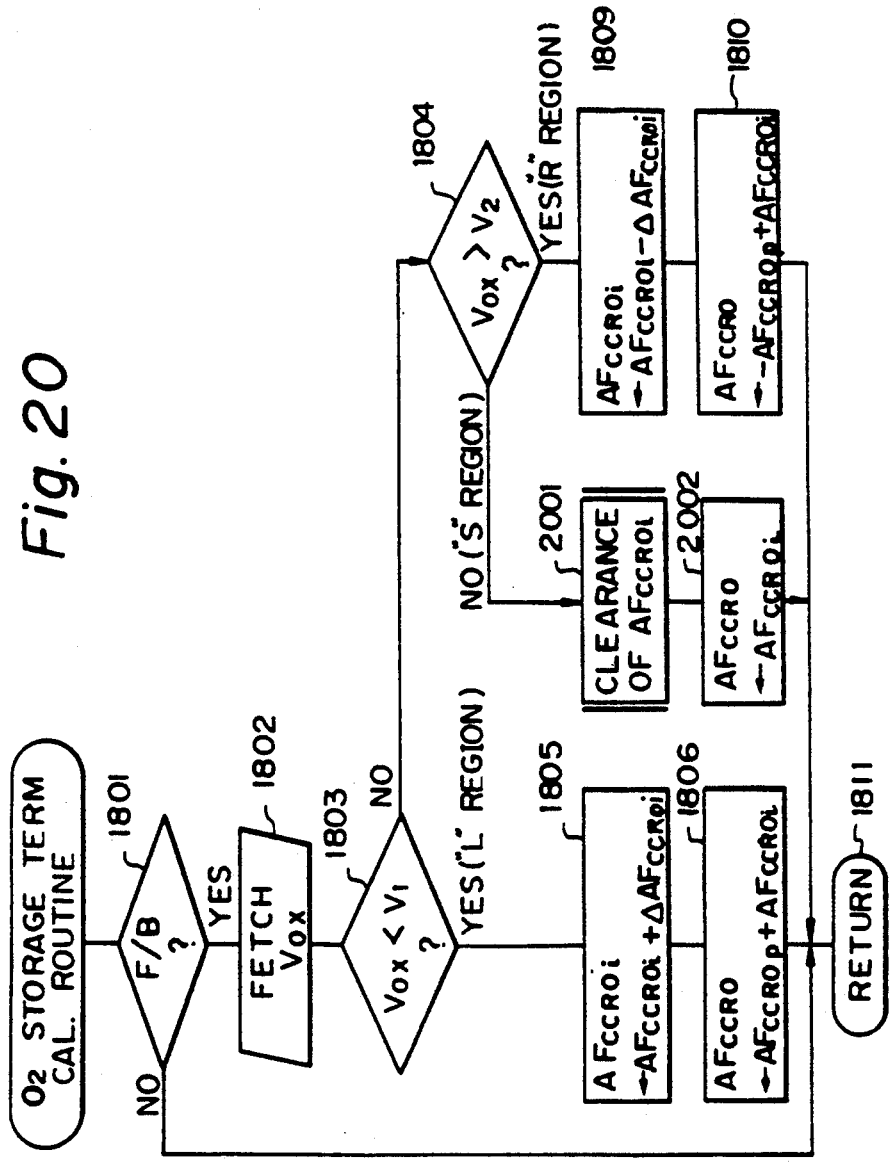

In FIG. 20, which is a modification of FIG. 18, steps 2001 and 2002 are provided instead of steps 1807 and 1808 of FIG. 18. In the "S" region, although the $O_2$ storage term $AF_{CCRO}$ is always held at 0 in the routine of FIG. 18, the $O_2$ storage term $AF_{CCRO}$ is not always held at 0 in the routine of FIG. 20. Namely, when the output $V_{OX}$ of the $O_2$ sensor 14 is in the "S" region, the control proceeds to step 2001 which carries out a clearance of the integral $O_2$ storage term $AF_{CCROi}$, which will be later explained with reference to FIGS. 21, 23, 25, and 27. Then, at step 2002, the $O_2$ storage term $AF_{CCRO}$ is replaced by the integral $O_2$ storage term $AF_{CCROi}$.

Figure 21:
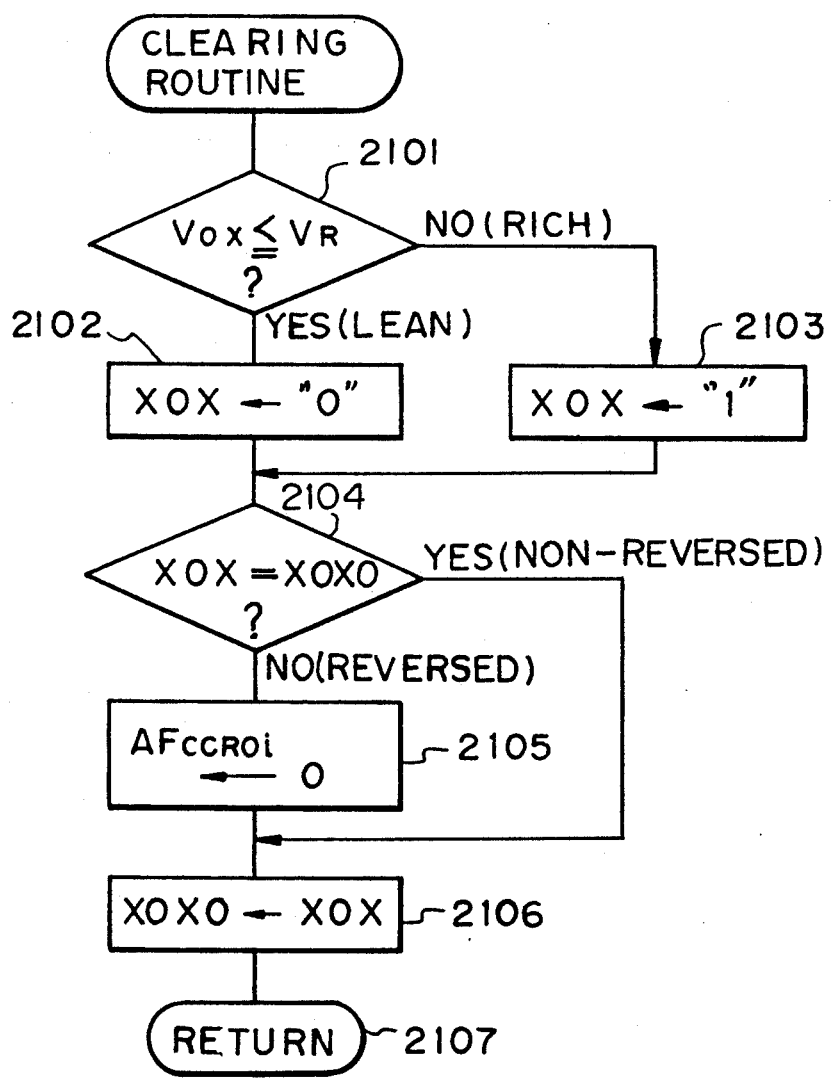
Figure 23:
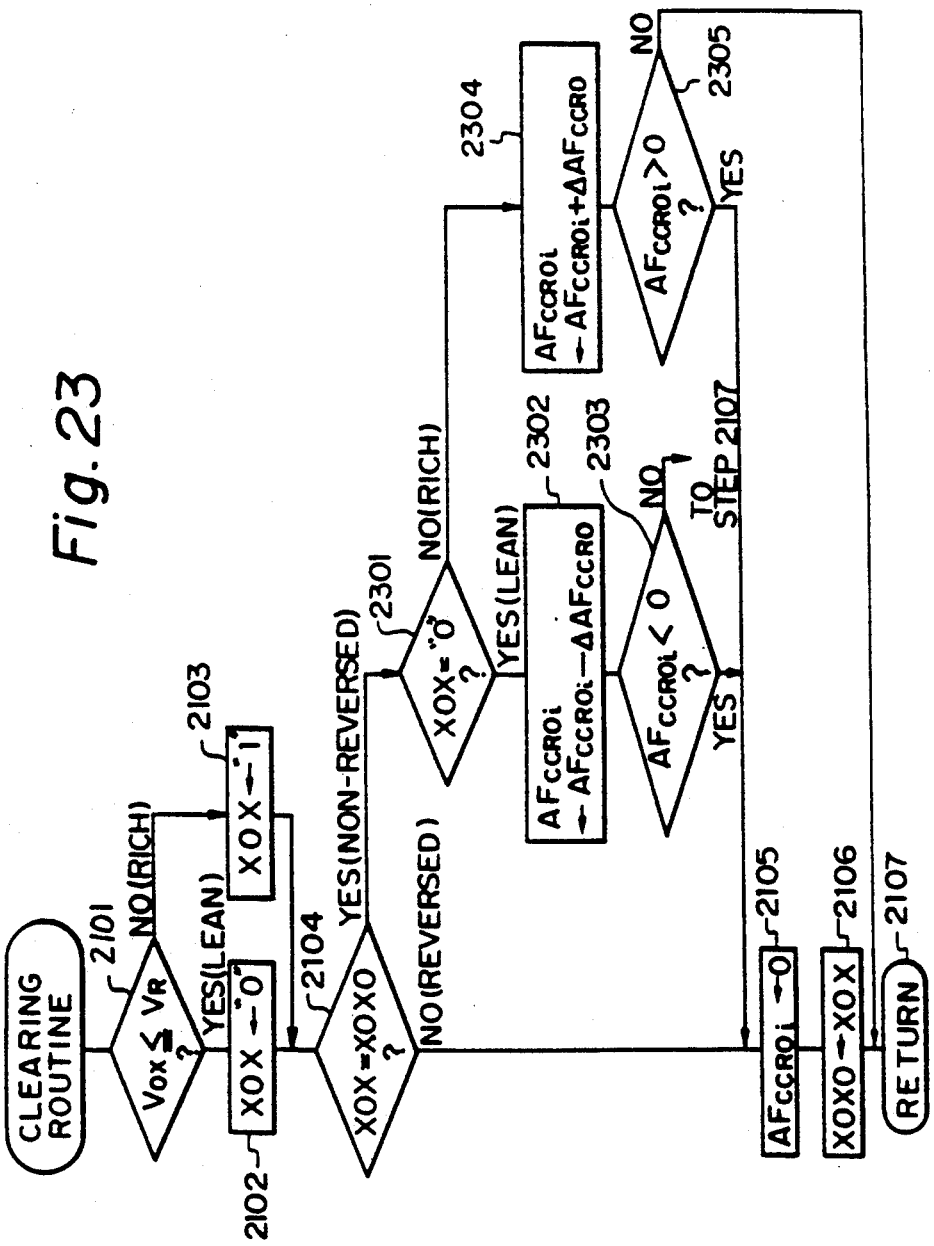
Figures 25, 25A:
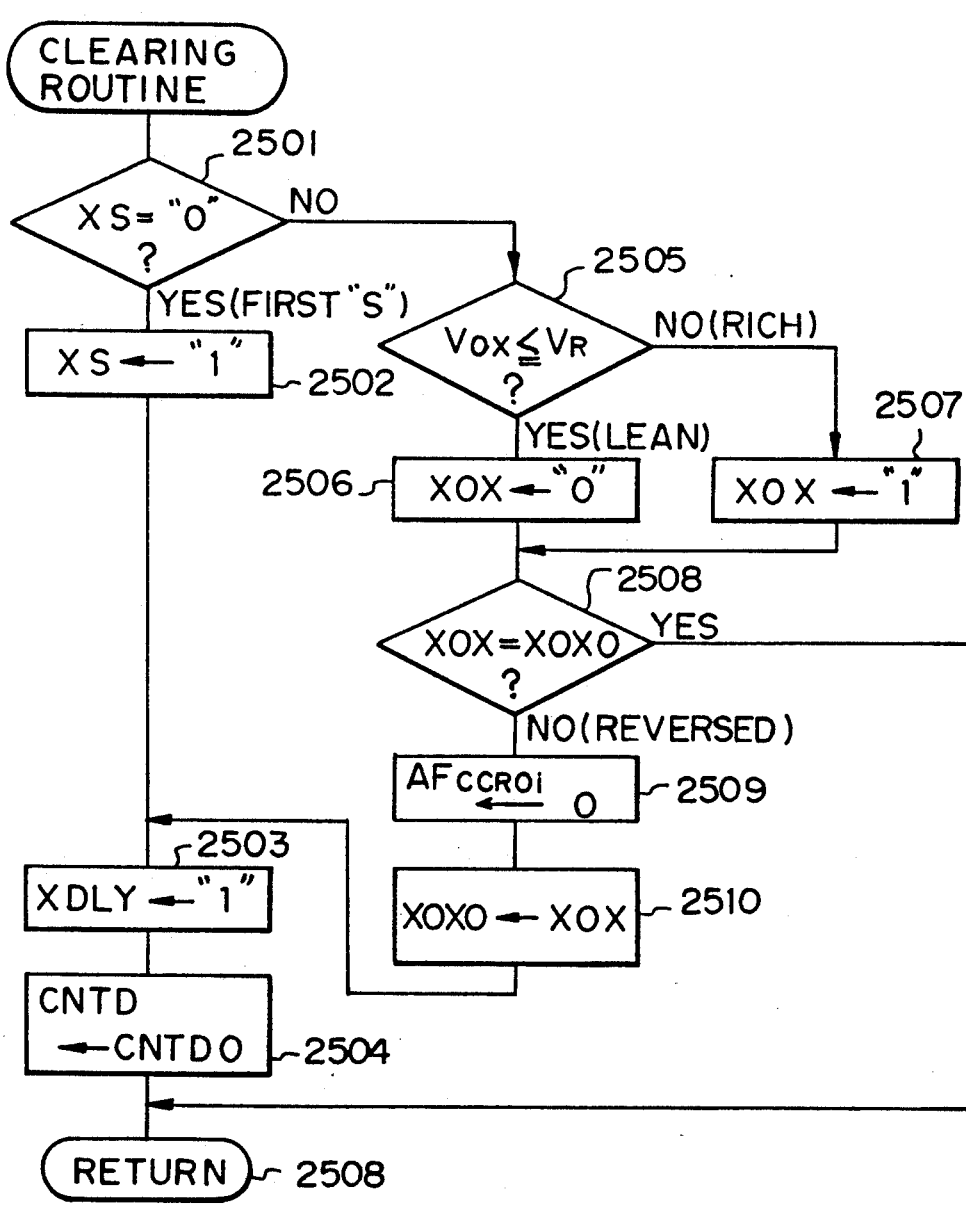
Figure 25B:
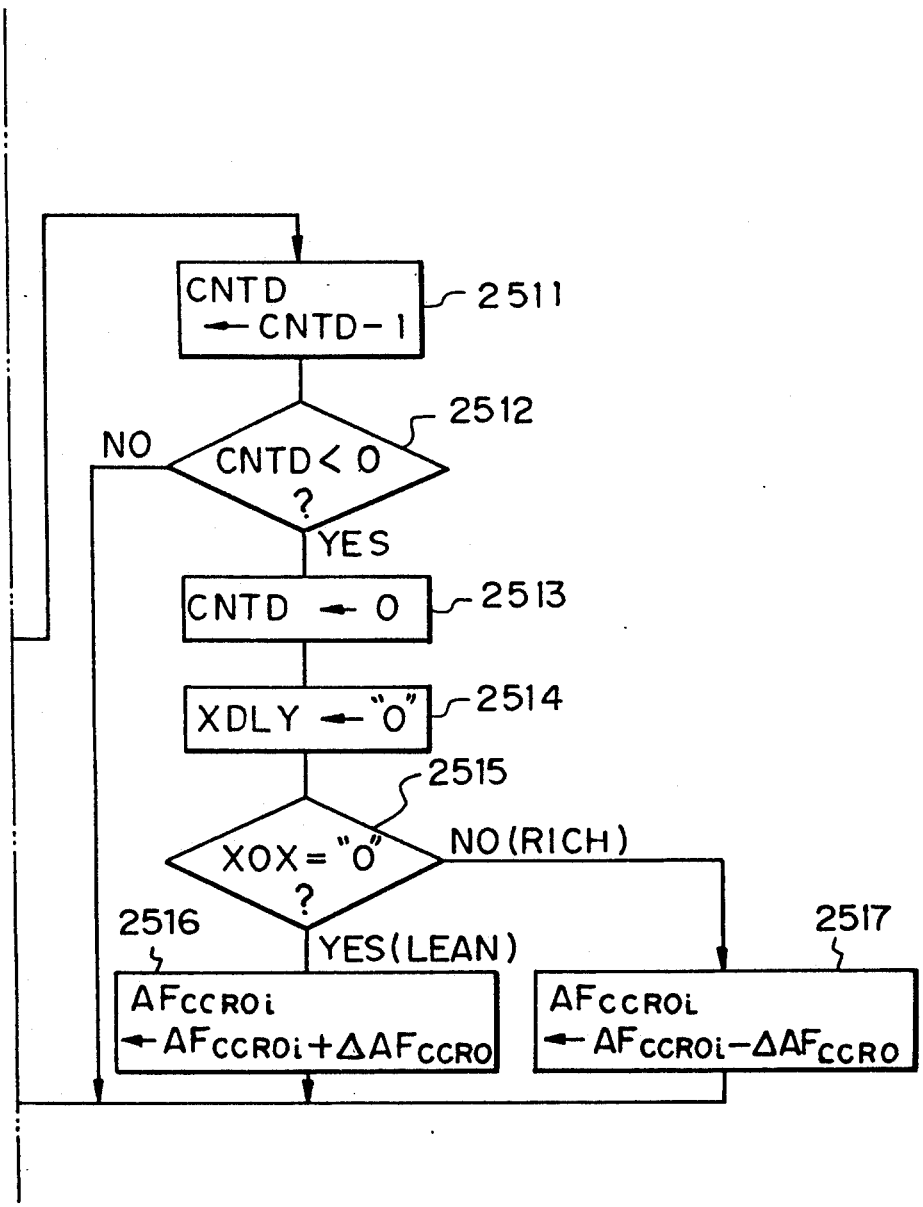
Figure 27B:
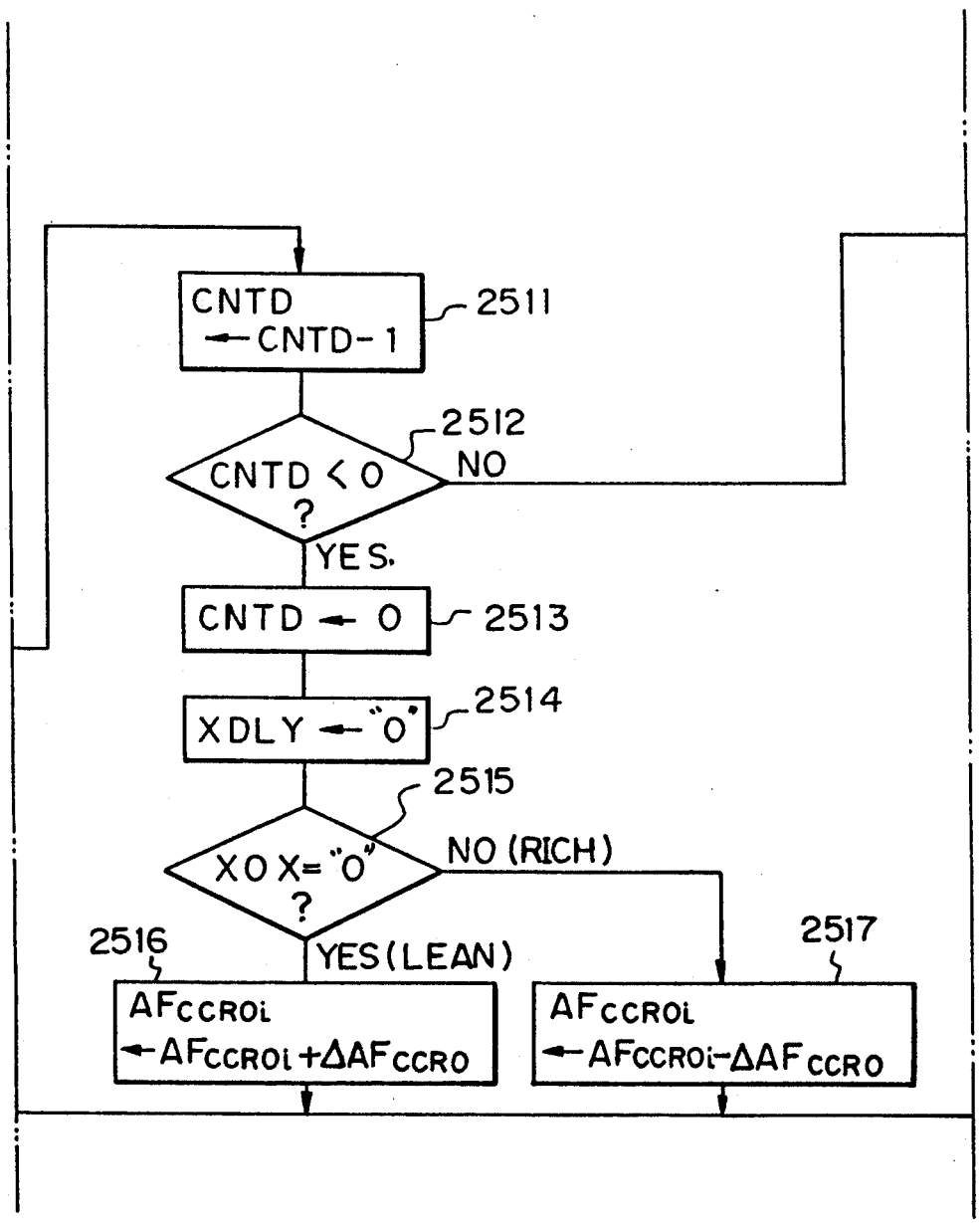
Figure 27C:
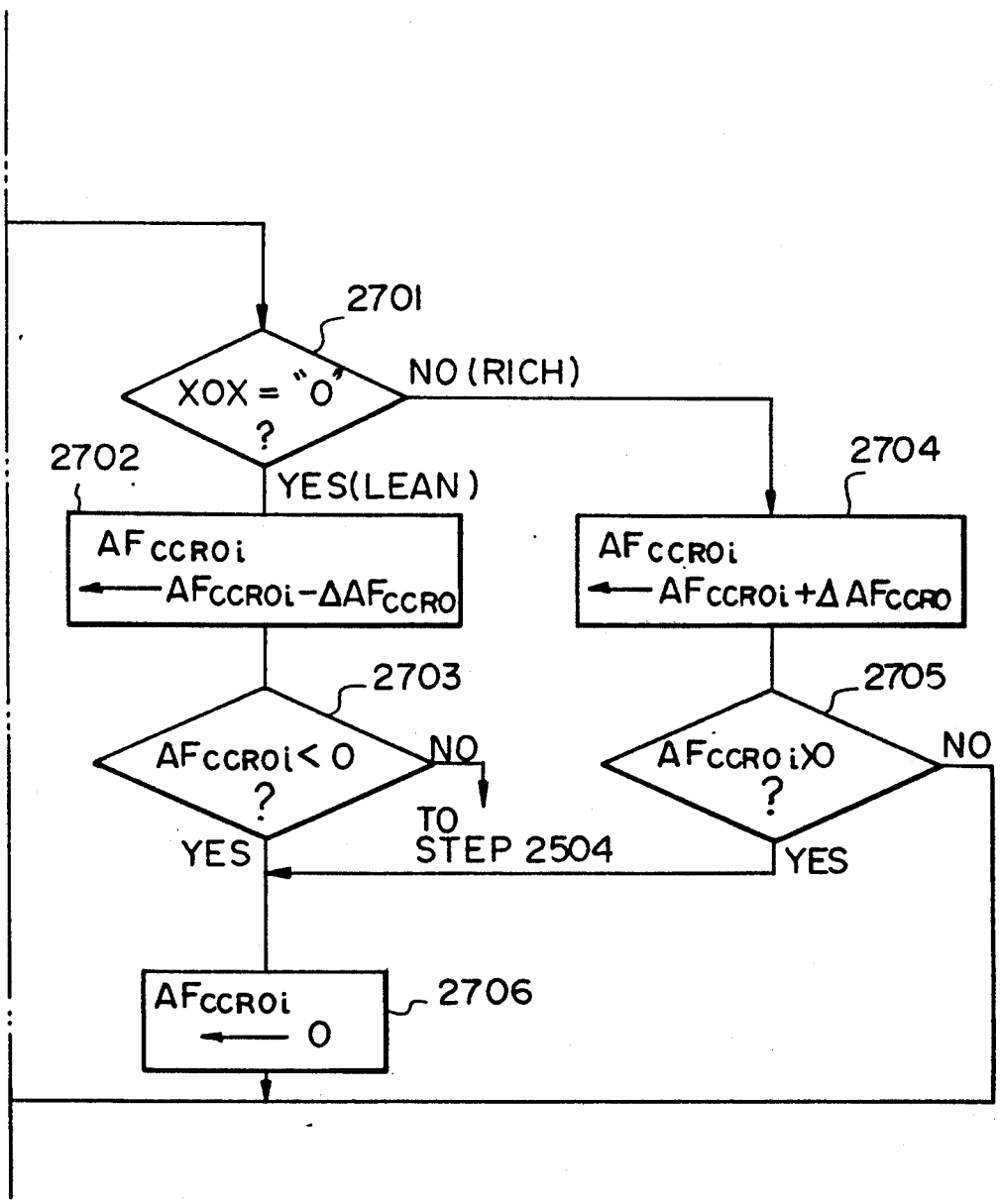

The clearance step 2001 of FIG. 20 will be explained with reference to FIGS. 21, 23, 25, and 27. In FIG. 21, in the "S" region, the integral $O_2$ storage term $AF_{CCROi}$ is held at a value thereof immediately before the switching of the "L" region (or the "R" region to the "S" region, and then is cleared when the output $V_{OX}$ of the $O_2$ sensor 14 crosses the reference voltage $V_R$ corresponding to the stoichiometric air-fuel ratio, thus improving the convergence of the controlled air-fuel ratio to the stoichiometric air-fuel ratio. In FIG. 23, in the "S" region, the absolute value of the integral $O_2$ storage term $AF_{CCROi}$ is gradually decreased, to reduce the change of the sum of $AF_f$, $AF_c$, and $AF_{CCRO}$ at the switching of the output of the $O_2$ sensor 14 with respect to the reference voltage $V_R$, to thereby further improve the drivability. In FIGS. 25 and 27, a delay operation is introduced into the routines of FIGS. 21 and 23, respectively, to thereby avoid the reduction of the cleaning-up performance of the catalyst converter 12 due to the long duration for which the output $V_{OX}$ of the $O_2$ sensor 14 remains either on the lean side or on the rich side with respect to the stoichiometric air-fuel ratio, in the "S" region.

In FIG. 21, at step 2101, it is determined whether the output $V_{OX}$ of the $O_2$ sensor 14 is on the lean side ($V_{OX} \leq V_R$) or on the rich side ($V_{OX} > V_R$), and as a result, at step 2102 or 2103, the air-fuel ratio flag XOX is made "0" (lean) or "1" (rich). At step 2104, it is determined whether or not the controlled air-fuel ratio is reversed, by comparing the air-fuel ratio flag XOX with the previous air-fuel ratio flag XOXO. As a result, only when the controlled air-fuel ratio is reversed does the control proceed to step 2105, which clears the integral $O_2$ storage term $AF_{CCROi}$. Then, at step 2106, the previous air-fuel ratio flag XOXO is replaced by the current air-fuel ratio flag XOX, to prepare the next execution. Thus, this routine is completed by step 2107.

Figure 22:
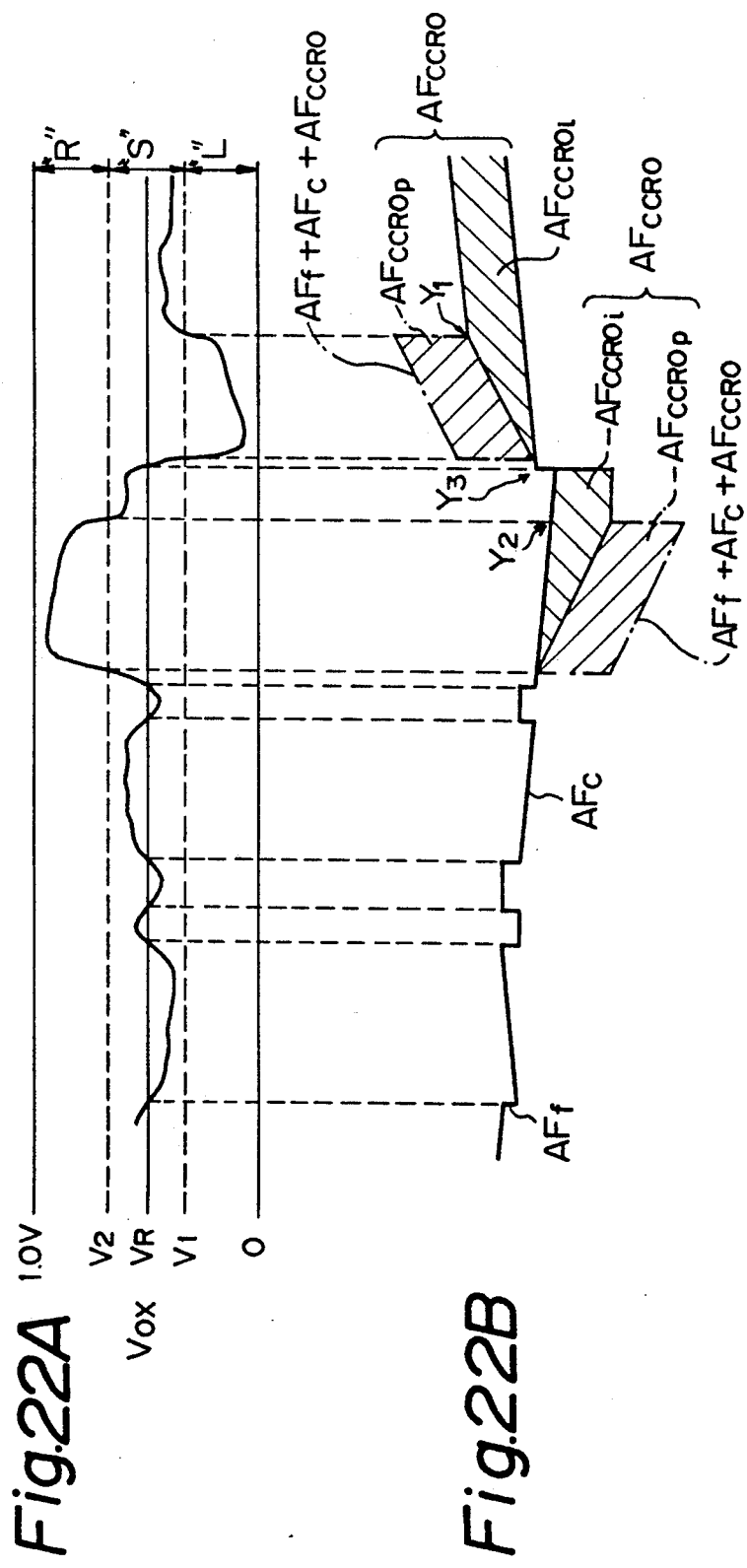
FIGS. 22A and 22B are timing diagrams explaining the flow charts of FIGS. 20, and 21.

Namely, according to the routine of FIG. 21, as shown in FIGS. 22A and 22B, even when the output $V_{OX}$ of the $O_2$ sensor 14 enters the "S" region from the "L" region or the "R" region, the integral $O_2$ storage term $AF_{CCROi}$ is not cleared, as indicated by arrows $Y_1$ and $Y_2$. Namely, only when the output of the $O_2$ sensor 14 crosses the reference voltage $V_R$ is the integral $O_2$ storage term $AF_{CCROi}$ cleared, as indicated by $Y_3$. Therefore, even when the output $V_{OX}$ of the $O_2$ sensor 14 is moved from the "L" region or the "R" region to the "S" region, the presence of the $O_2$ storage term $AF_{CCRO}$ (precisely, the integral $O_2$ storage term $AF_{CCROi}$) attributes to the convergence of the controlled air-fuel ratio to the stoichiometric air-fuel ratio.

In FIG. 23, which is a modification of FIG. 21, steps 2301 through 2305 are added to the routine of FIG. 21, to gradually decrease the absolute value of the integral $O_2$ storage term $AF_{CCROi}$ in the "S" region. Namely, when the controlled air-fuel ratio is lean (XOX = "0"), the control proceeds to steps 2301 and 2302 which gradually decrease the integral $O_2$ storage term $AF_{CCROi}$. In this case, the integral $O_2$ storage term $AF_{CCROi}$ is maintained at steps 2303 and 2105 by 0. On the other hand, when the controlled air-fuel ratio is rich.(XOX="1"), the control proceeds to steps 2301 and 2304, which gradually increase the integral $O_2$ storage term $AF_{CCROi}$. In this case, the integral $O_2$ storage term $AF_{CCROi}$ is maintained at steps 2305 and 2105 by 0.

Figure 24:
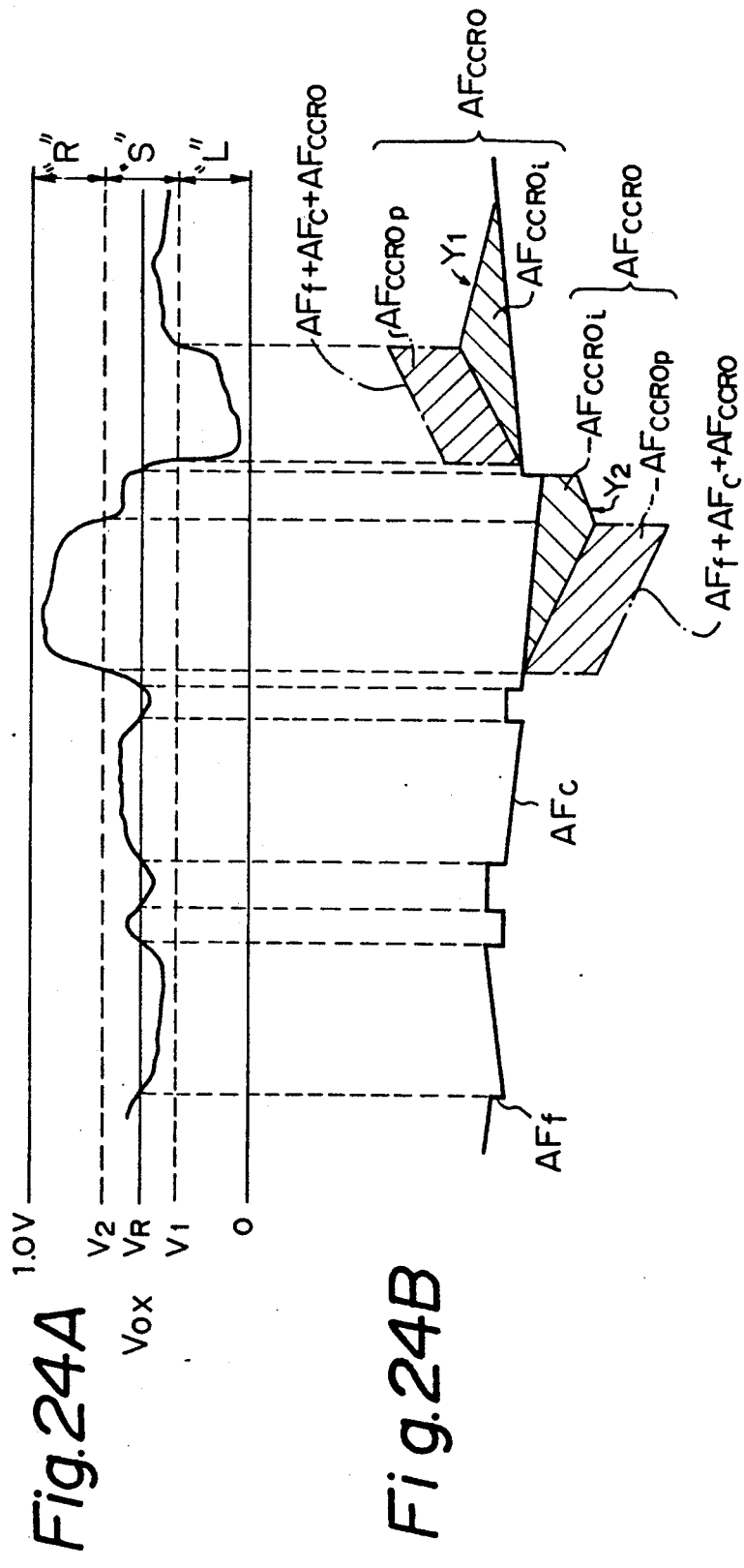
FIGS. 24A and 24B are timing diagrams explaining the flow charts of FIGS. 20 and 23.

Thus, according to the routine of FIG. 23, the sum of $AF_f + AF_c + AF_{CCRO}$ is smoothly changed as indicated by $Y_1$ and $Y_2$ in FIGS. 24A and 24B, compared with FIGS. 22A and 22B, to thereby further improve the drivability.

In FIG. 25, a delay operation is introduced into the routine of FIG. 21. In FIG. 25, flags XS and XDLY, and counter CNTD are defined as follows:

XS (="1") designates a flag showing that the output $V_{OX}$ of the $O_2$ sensor 14 is in the "S" region;

XDLY designates a flag for delaying the start of renewal of the integral $O_2$ storage term $AF_{CCROi}$; and CNTD designates a counter value for measuring a delay time.

At step 2501, it is determined whether the output $V_{OX}$ of the $O_2$ sensor 14 first enters the "S" region by comparing the flag XS with "0" (the "L" region or "R" region). As a result, when the output $V_{OX}$ of the $O_2$ sensor 14 first enters the "S" region, the control proceeds to step 2502 which sets the flag XS (XS="1"), and then at steps 2503 and 2504 a delay operation is started. Namely, at step 2503, the delay operation flag XDLY is set (XDLY="1"), and at step 2504, a delay time CNTDO is set in the counter value CNTD. Then, this routine is completed by step 2508.

Note, when the output $V_{OX}$ of the $O_2$ sensor 14 is reversed with respect to the reference voltage $V_R$, a delay operation is also started by steps 2505 through 2510. Namely, at step 2505, it is determined whether or not the controlled air-fuel ratio is lean ($V_{OX} \leq V_R$) or rich ($V_{OX} > V_R$). As a result, the air-fuel ratio flag XOX is set or reset at step 2506 or 2507 in accordance with the determination at step 2505. At step 2508, it is determined whether or not the controlled air-fuel ratio is reversed, by comparing the air-fuel ratio flag XOX with the previous air-fuel ratio flag XOX0. As a result, since the controlled air-fuel ratio is reversed (XOX≠XOXO), the control proceeds via steps 2509 and 2510 to steps 2503 and 2504, thereby restarting the delay operation. Note, steps 2509 and 2510 correspond to steps 2205 and 2206, respectively, and therefore, every time the output $V_{OX}$ of the $O_2$ sensor 14 crosses the reference voltage $V_R$, the integral $O_2$ storage term $AF_{CCROi}$ is cleared.

Except for the case wherein the output $V_{OX}$ of the $O_2$ sensor 14 first crosses into the "S" region, and the case wherein the output $V_{OX}$ of the $O_2$ sensor 14 crosses the reference voltage $V_R$, the flow at steps 2511 through 2517 is carried out.

At step 2511 to 2513, the delay time CNTDO is measured by the counter value CNTD, and as a result, only when an actual time corresponding to the delay time CNTDO has passed does the control proceed to steps 2513 through 2517. Note this delay time is extended when the output $V_{OX}$ of the $O_2$ sensor 14 is reversed to again set the time CNTDO in the counter value CNTD before the delay time CNTDO has passed.

When the delay time CNTDO has passed, the control proceeds to step 2513 which clears the counter value CNTD, and then at step 2514, the delay operation flag XDLY is reset (XDLY="0"). Therefore, the integral $O_2$ storage term $AFA_{CCROi}$ is renewed by steps 2515 through 2517. Namely, when the control air-fuel ratio is lean (XOX="0"), the control at step 2515 proceeds to step 2516 which gradually increases the integral $O_2$ storage term $AF_{CCROi}$ by the definite value $\Delta AF_{CCRO}$, and when the control air-fuel ratio is rich (XOX="1"), the control at step 2515 proceeds to step 2517 which gradually decreases the integral $O_2$ storage term $AF_{CCROi}$ by the definite value $\Delta AF_{CCRO}$.

Thus, the routine of FIG. 25 is completed by step 2518.

Note, it is assumed that the flag XS is reset by the routine of FIG. 20 when $V_{OX} < V_1$ ("L" region) or $V_{OX} > V_2$ ("R" region).

Thus, according to the routine of FIG. 25, as shown in FIGS. 26A, 26B, and 26C, when the output $V_{OX}$ of the $O_2$ sensor 14 remains on the lean side ($V_1 - V_R$) or on the rich side ($V_R - V_2$) within the "S" region for a longer time than the delay time CNTDO, the integral $O_2$ storage term $AF_{CCROi}$ is changed in accordance with the output $V_{OX}$ of the $O_2$ sensor 14, as indicated by $Z_1, Z_2, Z_3$ in FIG. 26C, and this contributes to the convergence of the controlled air-fuel ratio to the stoichiometric air-fuel ratio. Note, before the delay time CNTDO has passed, the integral $O_2$ storage term $AF_{CCROi}$ is held at the value thereof within the "S" region, in the same way as in FIGS. 22a and 22B.

In FIG. 27, which is a modification of FIG. 23, a delay operation is introduced into the routine of FIG. 23. Namely, FIG. 27 is a modification of FIG. 25. That is, the routine of FIG. 27 is composed of the routine of FIG. 25 and steps 2701 through 2706, which correspond to steps 2301 through 2305, and 2105, respectively, of FIG. 23. Therefore, in the "S" region, when the output $V_{OX}$ of the $O_2$ sensor 14 is on the lean side ($V_1 \leq V_{OX} \leq V_R$) or on the rich side ($V_R < V_{OX} \leq V_2$), the control proceeds to steps 2701 through 2706 before the delay time has passed. Namely, when the controlled air-fuel ratio is lean (XOX="0"), the control proceeds to steps 2701 and 2702 which gradually decrease the integral $O_2$ storage term $AF_{CCROi}$. In this case, the integral $O_2$ storage term $AF_{CCROi}$ is maintained at steps 2703 and 2706 at 0. On the other hand, when the controlled air-fuel ratio is rich (XOX="1"), the control proceeds to steps 2701 and 2704 which gradually increase the integral $O_2$ storage term $AF_{CCROi}$. In this case, the integral $O_2$ storage term $AF_{CCROi}$ is maintained at steps 2705 and 2706 at 0.

Figures 28A, 28B, 28C:
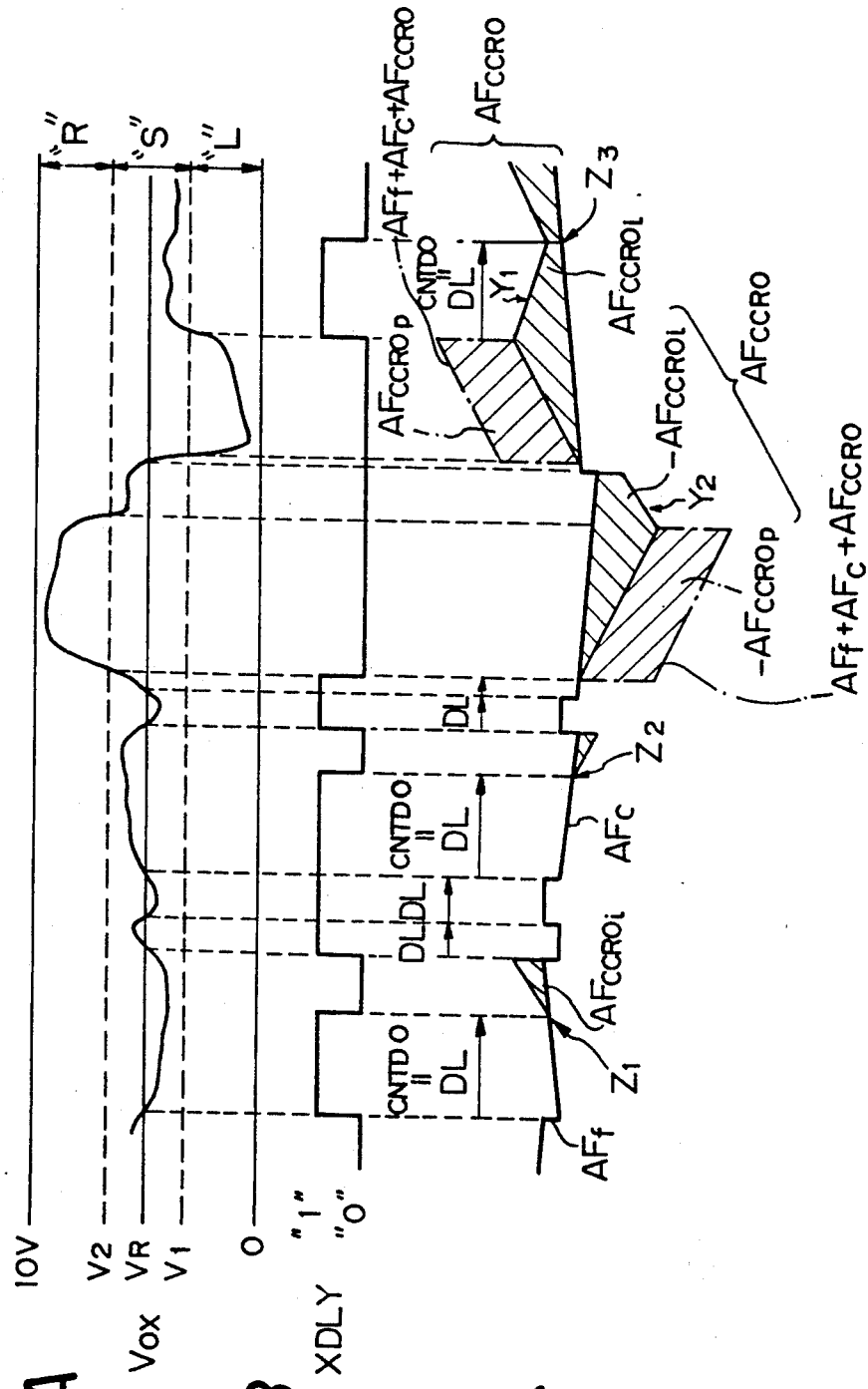
FIGS. 28A, 28B, and 28C are timing diagrams explaining the flow charts of FIGS. 20 and 27.

Thus, according to the routine of FIG. 27, the sum of $AF_f + AF_c + AF_{CCRO}$ is smoothly changed as indicated by $Y_1$ and $Y_2$ in FIGS. 28A, 28B, 28C, compared with FIGS. 26A, 26B, and 26C to thereby improve the drivability.

To exhibit a superior cleaning effect of the catalyst converter 12, a self-oscillating term (forcibly-oscillating term) $AF_s$ is introduced into the control of the air-fuel ratio, as explained below.

Figure 29:
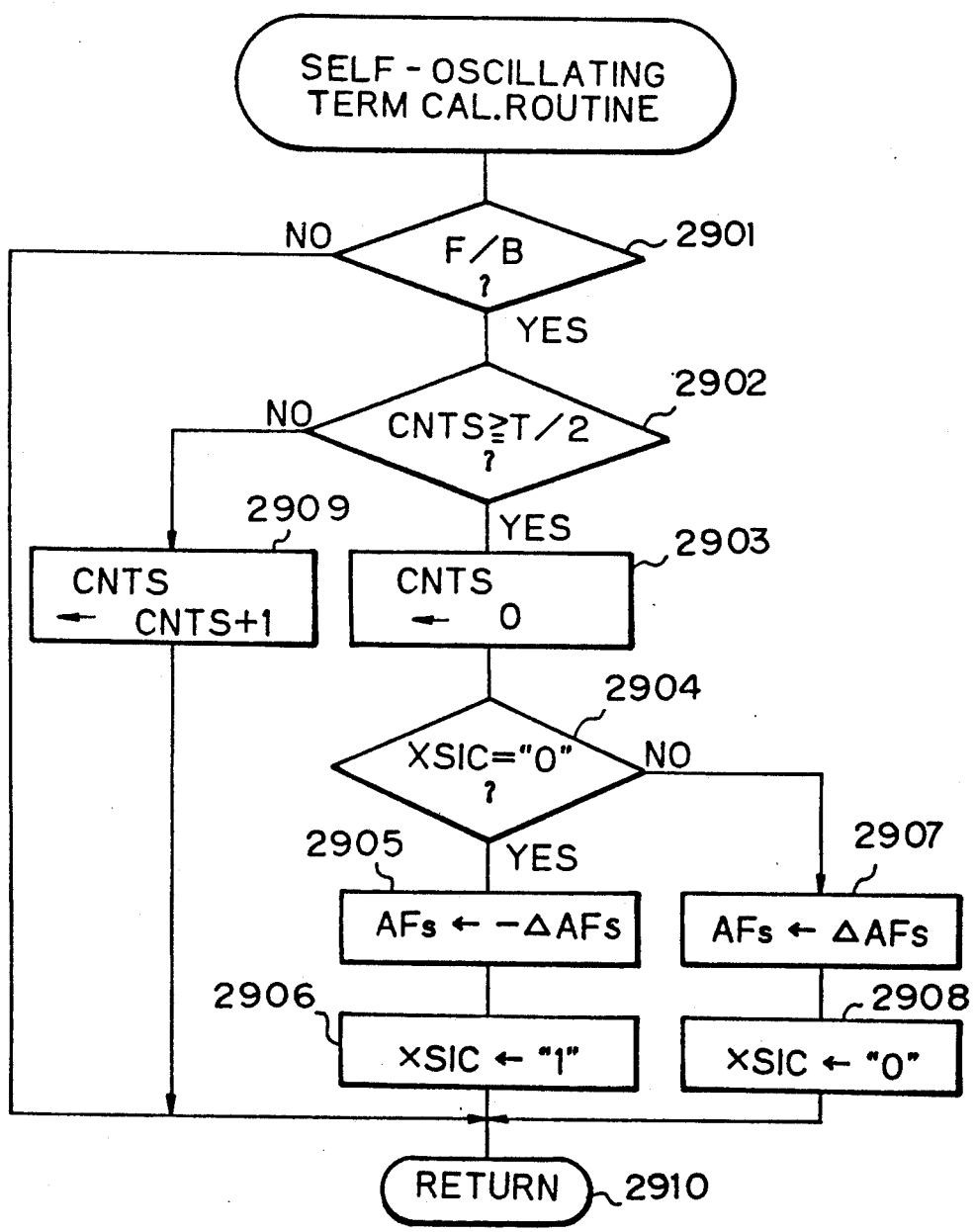

In FIG. 29, which is a routine for calculating a self-oscillating term $AF_s$ executed at a time such as 4 ms, at step 2901 it is determined whether or not all of the air-fuel ratio feedback conditions are satisfied, in the same way as at step 401 of FIG. 4. As a result, when one or more of the air-fuel ratio feedback conditions are satisfied, the control proceeds directly to step 2910, and if all of the air-fuel ratio feedback conditions are satisfied, the control proceeds to step 2902. At step 2902, it is determined whether or not a counter value CNTS has reached T/2, where T is a period of the self-oscillating term $AF_s$. That is, since the counter value CNTS is counted up by +1 at step 2909, the control at step 2902 proceeds to steps 2903 to 2908 at every time T/2.

Steps 2903 to 2908 will be explained. At step 903, the counter value CNTS is cleared, and then at step 2904 it is determined whether or not a self-oscillating flag XSIC is "0". As a result, when XSIC="0", the control proceeds to step 2905 which causes the self-oscillating term $AF_s$ to be $-\Delta AF_s$ (definite value), thus reversing the self-oscillating flag XSIC at step 906. As a result, the counter value CNTS again reaches T/2 and the control at step 2904 proceeds to step 2907, which causes the self-oscillating term $AF_s$ to be $\Delta AF_s$, thus reversing the self-oscillating flag XSIC at step 2908.

Then this routine is completed at step 2910.

Figure 30:
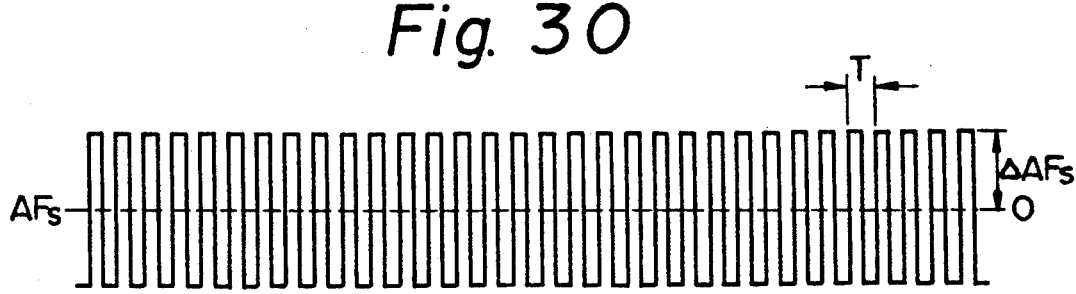
FIG. 30 is a timing diagram explaining the flow chart of FIG. 29.

Thus, according to the routine of FIG. 29, a self-oscillating term $AF_s$ having a definite amplitude $\Delta AF_s$ and a period T is generated as shown in FIG. 30.

Figure 31:
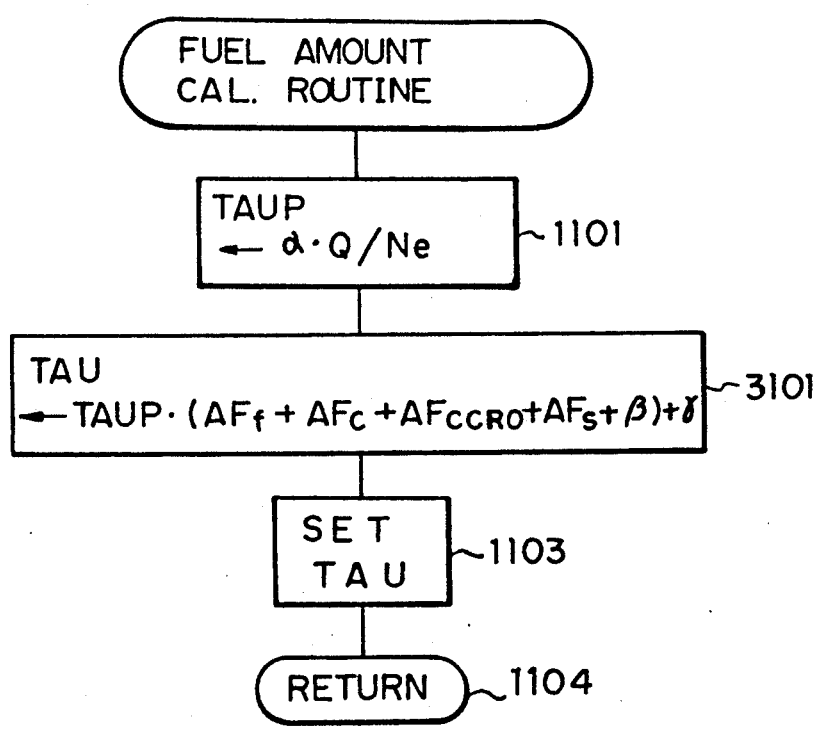

In FIG. 31, which is another routine for calculating a fuel injection amount, step 3101 is provided instead of step 1101 of FIG. 11, thus introducing the self-oscillating term $AF_s$ into the fuel injection amount TAU. That is, at step 2101, the final fuel injection amount TAU is calculated by $$TAU \leftarrow TAUP \cdot (AF_f + AF_c + AF_{CCRO} + AF_s + \beta) + \gamma$$

Note that the present invention can be applied to a single O₂ sensor system where the O₂ sensor 14, is located within the catalyst converter 12, as explained above.

Also, a Karman vortex sensor, a heat-wire type flow sensor, and the like can be used instead of the airflow meter.

Although in the above-mentioned embodiments, a fuel injection amount is calculated on the basis of the intake air amount and the engine speed, it can be also calculated on the basis of the intake air pressure and the engine speed, or the throttle opening and the engine speed.

Further, the present invention can also be applied to a carburetor type internal combustion engine in which the air-fuel ratio is controlled by an electric air control value (EACV) for adjusting the intake air amount; by an electric bleed air control valve for adjusting the air bleed amount supplied to a main passage and a slow passage; or by adjusting the secondary air amount introduced into the exhaust system. In this case, the base fuel injection amount corresponding to TAUP at step 1101 of FIG. 11 or at step 1101 of FIG. 31 is determined by the carburetor itself, i.e., the intake air negative pressure and the engine speed, and the air amount corresponding to TAU is calculated at step 1102 of FIG. 11, or at step 3101 of FIG. 31.

Further, a CO sensor, a lean-mixture sensor or the like can be also used instead of the O₂ sensor.

As explained above, according to the present invention, the convergence of the controlled air-fuel ratio to the stoichiometric air-fuel ratio can be improved by introducing the O₂ storage term into the control of the air-fuel ratio, and further, the frequency of the controlled air-fuel ratio is maintained at a high value, thereby exhibiting a full capability of the three-way catalyst converter.

I claim:

1. A method of controlling an air-fuel ratio in an internal combustion engine having a three-way catalyst converter for storing O₂ and removing pollutants in the exhaust gas of said engine, and an air-fuel ratio sensor, disposed downstream of or within said three-way catalyst converter, for detecting a specific component in the exhaust gas, comprising the steps of:

gradually increasing a coarse-adjusting term when an output of said air-fuel ratio sensor is on the lean side with respect to a stoichiometric air-fuel ratio;

gradually decreasing said coarse-adjusting term when said output of said air-fuel ratio sensor is on the rich side with respect to said stoichiometric air-fuel ratio;

determining whether an air-fuel ratio downstream of said three-way catalyst converter is in a lean air-fuel ratio region, in a stoichiometric air-fuel ratio region, or in a rich air-fuel ratio region, by said output of said air-fuel ratio sensor;

setting an O₂ storage term to a first value to make an actual air-fuel ratio rich with respect to said stoichiometric ratio immediately after said air-fuel ratio downstream of said three-way catalyst converter moves into a lean air-fuel ratio region;

setting said O₂ storage term to a second value to make said actual air-fuel ratio lean with respect to said stoichiometric air-fuel ratio immediately after said air-fuel ratio downstream of said three-way catalyst converter moves into a rich air-fuel ratio region;

setting said O₂ storage term to a third value to make no change in said actual air-fuel ratio when said air-fuel ratio downstream of said three-way catalyst converter is in a stoichiometric air-fuel ratio region; and adjusting said actual air-fuel ratio upstream of said three-way catalyst converter in accordance with said coarse-adjusting term and said O₂ storage term.

2. The method of claim 1, wherein:

said first value is a positive to thereby increase an amount of fuel supplied to said engine, said second value is a negative value to thereby decrease said amount of fuel supplied to said engine, said third value is a value to thereby keep said amount of fuel at a same level.

3. The method of claim 1, wherein an absolute value of said first value is made larger as said output of said air-fuel sensor deviates from said stoichiometric air-fuel ratio value.

4. The method of claim 1, wherein an absolute value of said second value is made larger as said output of said air-fuel sensor deviates from said stoichiometric air-fuel ratio value.

5. The method of claim 2, further comprising the step of increasing an absolute value of said first value in accordance with a running time from a timing when said first value is set.

6. The method of claim 2, further comprising a step of increasing an absolute value of said second value in accordance with a running time running from a timing when said second value is set.

7. A method of controlling an air-fuel ratio in an internal combustion engine having a three-way catalyst converter for storing O₂ and removing pollutants in the exhaust gas of said engine, and an air-fuel ratio sensor, disposed downstream of or within said three-way catalyst converter, for detecting a specific component in the exhaust gas, comprising the steps of:

gradually increasing a coarse-adjusting term when an output of said air-fuel ratio sensor is on the lean side with respect to a stoichiometric air-fuel ratio;

gradually decreasing said coarse-adjusting term when said output of said air-fuel ratio sensor is on the rich side with respect to said stoichiometric air-fuel ratio;

determining whether an air-fuel ratio downstream of said three-way catalyst converter is in a lean air-fuel ratio region by detecting whether a change of a load of said engine is larger than a predetermined positive change;

determining whether said air-fuel ratio downstream of said three-way catalyst converter is in a rich air-fuel ratio region by detecting whether said change of a load of said engine is smaller than a predetermined negative change;

determining whether said air-fuel ratio downstream of said three-way catalyst converter is in a stoichiometric air-fuel ratio region by detecting whether said change of a load of said engine is in a range between said predetermined positive change and said predetermined negative change;

setting an $O_2$ storage term to a first value to make an actual air-fuel ratio rich with respect to a stoichiometric air-fuel ratio immediately after said air-fuel ratio downstream of said three-way catalyst converter moves into a lean air-fuel ratio region;

setting said $O_2$ storage term to a second value to make said actual air-fuel ratio lean with respect to said stoichiometric air-fuel ratio immediately after said air-fuel ratio downstream of said three-way catalyst converter moves into a rich air-fuel ratio region;

setting said $O_2$ storage term to a third value to make no change in said actual air-fuel ratio when said air-fuel ratio downstream of said three-way catalyst converter is in a stoichiometric air-fuel ratio region; and adjusting said actual air-fuel ratio upstream of said three-way catalyst converter in accordance with said coarse-adjusting term and said $O_2$ storage term.

8. The method of claim 7, wherein:
said first value is a positive value thereby to increase an amount of fuel supplied to said engine,
said second value is a negative value thereby to decrease said amount of fuel supplied to said engine,
said third value is a value to thereby keep said amount of fuel at a same level.

9. The method of claim 8, wherein an absolute value of said first value is made larger as an absolute value of the change of a load of said engine becomes larger.

10. The method of claim 8, wherein an absolute value of the second value is made larger as an absolute value of the change of a load of said engine becomes larger.

11. A method of controlling an air-fuel ratio in an internal combustion engine having a three-way catalyst converter for storing $O_2$ and removing pollutants in the exhaust gas of said engine, and an air-fuel ratio sensor, disposed downstream of or within said three-way catalyst converter, for detecting a specific component in the exhaust gas, comprising the steps of:

gradually increasing a coarse-adjusting term when an output of said air-fuel ratio sensor is smaller than a first predetermined value corresponding to a stoichiometric air-fuel ratio to gradually make an actual air-fuel ratio upstream of said catalyst converter rich with respect to said stoichiometric air-fuel ratio;

gradually decreasing said coarse-adjusting term when said output of said air-fuel ratio sensor is larger than said first predetermined value in order to gradually make said actual air-fuel ratio lean with respect to said stoichiometric air-fuel ratio;

determining whether an output of said air-fuel sensor is smaller than a second predetermined value that is smaller than said first predetermined value;

setting a skip $O_2$ storage term of an $O_2$ storage term to a first fixed value to immediately make said actual air-fuel ratio rich with respect to said stoichiometric air-fuel ratio when said output of said air-fuel ratio sensor becomes smaller than said second predetermined value;

gradually increasing an integral $O_2$ storage term of said $O_2$ storage term as long as said output of said air-fuel ratio sensor is smaller than said second predetermined value;

determining whether said output of said air-fuel ratio sensor is larger than a third predetermined value that is larger than said first predetermined value;

setting said skip $O_2$ storage term of said $O_2$ storage term to a second fixed value to make said actual air-fuel ratio lean with respect to said stoichiometric air-fuel ratio immediately after said output of said air-fuel ratio sensor becomes larger than said third predetermined value;

gradually decreasing said integral $O_2$ storage term of said $O_2$ storage term as long as said output of said air-fuel ratio sensor is larger than said third predetermined value;

adjusting said actual air-fuel ratio upstream of said three-way catalyst converter in accordance with said coarse-adjusting term and said $O_2$ storage term formed by said skip $O_2$ storage term and said integral $O_2$ storage term.

12. The method of claim 11, wherein said integral $O_2$ storage term is varied more rapidly than said coarse-adjusting term.

13. A method of controlling an air-fuel ratio in an internal combustion engine having a three-way catalyst converter for storing $O_2$ and removing pollutants in the exhaust gas of said engine, and an air-fuel ratio sensor, disposed downstream of or within said three-way catalyst converter, for detecting a specific component in the exhaust gas, comprising the steps of:

gradually increasing a coarse-adjusting term when an output of said air-fuel ratio sensor is smaller than a first predetermined value corresponding to a stoichiometric air-fuel ratio to gradually make an actual air-fuel ratio upstream of said catalyst converter rich with respect to said stoichiometric air-fuel ratio;

gradually decreasing said coarse-adjusting term when said output of said air-fuel ratio sensor is larger than said first predetermined value to gradually make said actual air-fuel ratio lean with respect to said stoichiometric air-fuel ratio;

determining whether said output of said air-fuel sensor is smaller than a second predetermined value that is smaller than said first predetermined value;

setting a skip $O_2$ storage term of an $O_2$ storage term to a first fixed value to make said actual air-fuel ratio rich with respect to said stoichiometric air-fuel ratio, immediately after said output of said air-fuel ratio sensor becomes smaller than said second predetermined value;

setting said fixed first value of said skip O₂ storage term when said output of said air-fuel ratio sensor becomes larger than said second predetermined value;

gradually increasing an integral O₂ storage term of said O₂ storage term as long as said output of said air-fuel ratio sensor is smaller than said second predetermined value;

holding said integral O₂ storage term constant at a time when said output of said air-fuel ratio sensor becomes larger than said second value of said integral O₂ storage term until said output of said air-fuel ratio sensor becomes larger than said first value;

determining whether said output of said air-fuel sensor is larger than a third predetermined value that is larger than the first predetermined value;

setting said skip O₂ storage term of said O₂ storage term to a second fixed value to make said actual air-fuel ratio lean with respect to said stoichiometric air-fuel ratio immediately after said output of said air-fuel ratio sensor becomes larger than said third predetermined value;

resetting said fixed second value of said skip O₂ storage term when said output of said air-fuel ratio sensor becomes smaller than said third predetermined value;

gradually decreasing said integral O₂ storage term of said O₂ storage term as long as said output of said air-fuel ratio sensor is larger than said third predetermined value;

holding said integral O₂ storage term constant at a time when said output of said air-fuel ratio sensor becomes smaller than said third value of said integral O₂ storage term until said output of said air-fuel ratio sensor becomes smaller than said first value; and adjusting said actual air-fuel ratio upstream of said three-way catalyst converter in accordance with said coarse-adjusting term and said O₂ storage term.

14. The method of claim 13, wherein said integral O₂ storage term is varied more rapidly than said coarse-adjusting term.

15. A method of controlling an air-fuel ratio in an integral combustion engine having a three-way catalyst converter for storing O₂ and removing pollutants in the exhaust gas of said engine, and an air-fuel ratio sensor, disposed downstream of or within said three-way catalyst converter, for detecting a specific component in the exhaust gas, comprising the steps of:

gradually increasing a coarse-adjusting term when an output of said air-fuel ratio sensor is smaller than a first predetermined value corresponding to a stoichiometric air-fuel ratio to gradually make an actual air-fuel ratio upstream of said catalyst converter rich with respect to a stoichiometric air-fuel ratio;

gradually decreasing said coarse-adjusting term when said output of said air-fuel ratio sensor is larger than said first predetermined value to gradually make said actual air-fuel ratio lean with respect to said stoichiometric air-fuel ratio;

determining whether said output of said air-fuel sensor is smaller than a second predetermined value that is smaller than said first predetermined value;

setting a skip O₂ storage term of an O₂ storage term to a first fixed value to make an actual air-fuel ratio rich with respect to said stoichiometric air-fuel ratio immediately after said output of said air-fuel ratio sensor becomes smaller than said second predetermined value;

resetting said first fixed value of said skip O₂ storage term when said output of said air-fuel ratio sensor becomes larger than said second predetermined value;

gradually increasing an integral O₂ storage term of said O₂ storage term as long as said output of said air-fuel ratio sensor is smaller than said second predetermined value;

gradually decreasing said integral O₂ storage term of said O₂ storage term from a time when said output of said air-fuel ratio sensor becomes larger than said second predetermined value to a time when said output of said air-fuel ratio sensor becomes larger than said first predetermined value;

determining whether said output of said air-fuel sensor is larger than a third predetermined value that is larger than said first predetermined value;

setting said skip O₂ storage term of said O₂ storage term to a second fixed value to make said actual air-fuel ratio lean with respect to said stoichiometric air-fuel ratio immediately after said output of said air-fuel ratio sensor becomes larger than said third predetermined value;

resetting said second fixed value of said skip O₂ storage term when said output of said air-fuel ratio sensor becomes smaller than said third predetermined value;

gradually decreasing said integral O₂ storage term of said O₂ storage term as long as the output of said air-fuel ratio sensor is larger than said third predetermined value;

gradually increasing said integral O₂ storage term of said O₂ storage term from a time when said output of said air-fuel ratio sensor becomes smaller than said third predetermined value to a time when said output of said air-fuel ratio sensor becomes smaller than said first predetermined value;

adjusting said actual air-fuel ratio upstream of said three-way catalyst converter in accordance with said coarse-adjusting term and said O₂ storage term.

16. The method of claim 15, wherein said integral O₂ storage term is varied more rapidly than said coarse-adjusting term.

17. A method as set forth in claim 16, further comprising the steps of:

counting a first time when said output of said air-fuel ratio sensor continuously stays between said first predetermined value and said second predetermined value;

determining whether said counted first time is longer than a first predetermined time;

gradually increasing said integral O₂ storage term of said O₂ storage term from a time when said counted first time is longer than said first predetermined time;

counting a second time when said output of said air-fuel ratio sensor continuously stays between said first predetermined value and the said third predetermined value;

determining whether said counted second time is longer than a second predetermined time; and gradually decreasing said integral $O_2$ storage term of said $O_2$ storage term from a time when said counted second time is longer than said second predetermined time.

18. The method of claim 17, wherein:

said gradually increasing step comprises a step of resetting said integral $O_2$ storage term when said output of said air-fuel ratio sensor cross said first predetermined value, said gradually decreasing step comprising a step of resetting the integral $O_2$ storage when said output of said air-fuel ratio sensor crosses said first predetermined value.

19. The method of claim 15, further comprising the steps of:

counting a first time when said output of said air-fuel sensor continuously stays between said first predetermined value and said second predetermined value;

determining whether or not said counted first time is longer than a first predetermined time;

gradually increasing said integral $O_2$ storage term of said $O_2$ storage term from a time when said counted first time is longer than said first predetermined time;

counting a second time when said output of said air-fuel ratio sensor continuously stays between said first predetermined value and said third predetermined value;

determining whether or not said counted second time is longer than a second predetermined time; and gradually decreasing said integral $O_2$ storage term of said $O_2$ storage term from a time when said counted second time is longer than said second predetermined time.

20. The method of claim 19, wherein said gradually increasing step comprises a step of resetting said integral $O_2$ storage when said output of said air-fuel ratio sensor crosses said first predetermined value; and said gradually decreasing step comprises a step of resetting said integral $O_2$ storage when said output of said air-fuel ratio sensor crosses said first predetermined value.

21. A method of controlling an air-fuel ratio in an internal combustion engine having a three-way catalyst converter for storing $O_2$ and removing pollutants in the exhaust gas of said engine, and an air-fuel ratio sensor, disposed downstream of or within said three-way catalyst converter, for detecting a specific component in the exhaust gas, comprising the steps of:

gradually increasing a coarse-adjusting term when an output of said air-fuel ratio sensor is on a lean side with respect to a stoichiometric air-fuel ratio;

gradually decreasing said coarse-adjusting term when said output of said air-fuel ratio sensor is on a rich side with respect to said stoichiometric air-fuel ratio;

setting an $O_2$ storage term to a first value to rapidly expel excessive $O_2$ from said three-way catalyst converter when an amount of $O_2$ introduced into said three-way catalyst converter becomes larger than an amount of $O_2$ fully stored in said three-way catalyst converter;

setting said $O_2$ storage term to a second value to rapidly reduce un-burned pollutants such as HC And CO introduced into said three-way catalyst converter after said amount of $O_2$ is fully stored in said three-way converter, when said amount of $O_2$ stored in said three-way catalyst converter is completely consumed;

setting said $O_2$ storage term to a third value when said storage term is not set to either said first or said second values; and adjusting an actual air-fuel ratio in accordance with said one coarse-adjusting term and said $O_2$ storage term.

22. The method of claim 21, wherein:

said first value setting step comprises a step of determining whether or not said output of said air-fuel ratio sensor reaches a lean value shifted by a large amount to said lean side from a value corresponding to said stoichiometric air-fuel ratio, thereby determining whether said amount of $O_2$ introduced into said three-way catalyst converter becomes larger than said amount of $O_2$ fully stored in said three-way catalyst converter; and said second value setting step comprises a step of determining whether said output of said air-fuel ratio sensor reaches a rich value shifted by a large amount to said rich side from a value corresponding to said stoichiometric air-fuel ratio, thereby determining whether or not said amount of $O_2$ stored in said three-way catalyst converter is completely consumed.

23. The method of claim 21, wherein:

said first value setting step comprises a step of determining whether a change of a load of said engine is larger than a predetermined positive change, thereby determining whether said amount of $O_2$ introduced into said three-way catalyst converter becomes larger than said amount of $O_2$ fully stored in said three-way catalyst converter; and said second value setting step comprises a step of determining whether said change of said load of said engine is smaller than a predetermined negative change, thereby determining whether or not said amount of $O_2$ stored in said three-way catalyst converter is completely consumed.

24. The method of claim 23, wherein said first and second values are changed in accordance with said change of said load of said engine.

25. The method of claim 21, wherein:

said first value is a positive value by which said output of said air-fuel ratio sensor is on said rich side with respect to said stoichiometric air-fuel ratio;

said second value is a negative value by which said output of said air-fuel ratio sensor is on said lean side with respect to said stoichiometric air-fuel ratio; and said third value is zero by which said output of said air-fuel ratio sensor is maintained.

26. The method of claim 25, wherein:

said first value setting step comprises a step of determining whether a change of a load of said engine is larger than a predetermined positive change, thereby determining whether or not said amount of $O_2$ introduced into said three-way catalyst converter becomes larger than said amount of $O_2$ fully stored in said three-way catalyst converter; and said second value setting step comprising a step of determining whether said change of said load of said engine is smaller than a predetermined negative change, thereby determining whether or not said amount of $O_2$ stored in said three-way catalyst converter is completely consumed.

27. The method of claim 26, wherein said first and second values are changed in accordance with said change of said load of said engine.

28. The method of claim 25, wherein:
said first value setting step comprises a step of determining whether said output of said air-fuel ratio sensor reaches a lean value shifted by a large amount to said lean side from a value corresponding to said stoichiometric air-fuel ratio, thereby determining whether said amount of $O_2$ introduced into said three-way catalyst converter becomes larger than said amount of $O_2$ fully stored in said three-way catalyst converter; and
said second value setting step comprises a step of determining whether said output of said air-fuel ratio sensor reaches a rich value shifted by a large amount to said rich side from a value corresponding to said stoichiometric air-fuel ratio, thereby determining whether said amount of $O_2$ stored in said three-way catalyst converter is completely consumed.

29. The method of claim 28, wherein the absolute values of said first and second values are larger when said output of said air-fuel ratio sensor is deviated greatly from the value corresponding to said stoichiometric air-fuel ratio.

30. The method of claim 28, wherein:
the absolute value of said first value is larger when a period wherein said output of said air-fuel ratio sensor is on said lean side with respect to said stoichiometric air-fuel ratio is longer; and
the absolute value of said second value is larger when a duration wherein the output of said air-fuel ratio sensor is on said rich side with respect to said stoichiometric air-fuel ratio is longer.

31. The method of claim 28, wherein said first value setting step comprises the steps of:
setting a first fixed value as said first value in said $O_2$ storage term, when said output of said air-fuel ratio sensor reaches said lean value; and
gradually increasing said absolute value of said $O_2$ storage term, when said output of said air-fuel ratio sensor is on said lean side with respect to said stoichiometric air-fuel ratio.

32. The method of claim 28, wherein said second value setting step comprises the steps of:
setting a second fixed value as said second value in said $O_2$ storage term, when said output of said air-fuel ratio sensor reaches said rich value; and
gradually increasing said absolute value of said $O_2$ storage term, when said output of said air-fuel ratio sensor is on said rich side with respect to said stoichiometric air-fuel ratio.

33. Apparatus for controlling an air-fuel ratio in an internal combustion engine having a three-way catalyst converter for storing $O_2$ and removing pollutants in the exhaust gas of said engine, and an air-fuel ratio sensor, disposed downstream of or within said three-way catalyst converter, for detecting a specific component in the exhaust gas, said apparatus comprising:
means for changing a coarse-adjusting term, said changing means gradually increasing said coarse-adjusting term when an output of said air-fuel ratio sensor is on the lean side with respect to a stoichiometric air-fuel ratio and gradually decreasing said coarse-adjusting term when said output of said air-fuel ratio sensor is on the rich side with respect to said stoichiometric air-fuel ratio;
means for determining whether an air-fuel ratio downstream of said three-way catalyst converter is in a lean air-fuel ratio region, in a stoichiometric air-fuel ratio region, or in a rich air-fuel ratio region, by said output of said air-fuel ratio sensor;
means for setting an $O_2$ storage term, said setting means setting said $O_2$ storage term to:
a first value to make an actual air-fuel ratio rich with respect to said stoichiometric ratio immediately after said air-fuel ratio downstream of said three-way catalyst converter moves into a lean air-fuel ratio region;
a second value to make said actual air-fuel ratio lean with respect to said stoichiometric air-fuel ratio immediately after said air-fuel ratio downstream of said three-way catalyst converter moves into a rich air-fuel ratio region; and
a third value to make no change in said actual air-fuel ratio when said air-fuel ratio downstream of said three-way catalyst converter is in a stoichiometric air-fuel ratio region; and
means for adjusting said actual air-fuel ratio upstream of said three-way catalyst converter in accordance with said coarse-adjusting term and said $O_2$ storage term.

34. The apparatus of claim 33, wherein:
said first value is a positive value to thereby increase an amount of fuel supplied to said engine,
said second value is a negative value to thereby decrease said amount of fuel supplied to said engine,
said third value is a value to thereby keep said amount of fuel at a same level.

35. The apparatus of claim 34, wherein an absolute value of said first value is made larger as said output of said air-fuel sensor deviates from said stoichiometric air-fuel ratio value.

36. The apparatus of claim 34, wherein an absolute value of said second value is made larger as said output of said air-fuel sensor deviates from said stoichiometric air-fuel ratio value.

37. The apparatus of claim 34, wherein an absolute value of said first value is increased in accordance with a running time from a time when said first value is set.

38. The apparatus of claim 34, wherein an absolute value of said second value is increased in accordance with a running time from a time when said first value is set.

39. Apparatus for controlling an air-fuel ratio in an internal combustion engine having a three-way catalyst converter for storing $O_2$ and removing pollutants in the exhaust gas of said engine, and an air-fuel ratio sensor, disposed downstream of or within said three-way catalyst converter, for detecting a specific component in the exhaust gas said apparatus comprising:
means for changing a coarse-adjusting term, said changing means gradually increasing said coarse-adjusting term when an output of said air-fuel ratio sensor is on the lean side with respect to a stoichiometric air-fuel ratio and gradually decreasing said coarse-adjusting term when said output of said air-fuel ratio sensor is on the rich side with respect to said stoichiometric air-fuel ratio;
means for determining whether an air-fuel ratio downstream of said three-way catalyst converter is in a lean air-fuel ratio region, in a stoichiometric air-fuel ratio region, or in a rich air-fuel ratio region, by detecting whether a change of a load of said engine is larger than a predetermined positive change, smaller than a predetermined negative change, or in a range between said predetermined positive change and said predetermined negative change;

means for setting an $O_2$ storage term, said setting means setting said $O_2$ storage term to:
  a first value to make an actual air-fuel ratio rich with respect to said stoichiometric ratio immediately after said air-fuel ratio downstream of said three-way catalyst converter moves into a lean air-fuel ratio region;
  a second value to make said actual air-fuel ratio lean with respect to said stoichiometric air-fuel ratio immediately after said air-fuel ratio downstream of said three-way catalyst converter moves into a rich air-fuel ratio region; and
  a third value to make no change in said actual air-fuel ratio when said air-fuel ratio downstream of said three-way catalyst converter is in a stoichiometric air-fuel ratio region; and means for adjusting said actual air-fuel ratio upstream of said three-way catalyst converter in accordance with said coarse-adjusting term and said $O_2$ storage term.

40. The apparatus of claim 39, wherein:
said first value is a positive value thereby to increase an amount of fuel supplied to said engine,
said second value is a negative value thereby to decrease said amount of fuel supplied to said engine,
said third value is a value to thereby keep said amount of fuel at a same level.

41. The apparatus of claim 40, wherein an absolute value of said first value is made larger as an absolute value of the change of a load of said engine becomes larger.

42. The apparatus of claim 40, wherein an absolute value of the second value is made larger as an absolute value of the change of a load of said engine becomes larger.

43. Apparatus for controlling an air-fuel ratio in an internal combustion engine having a three-way catalyst converter for storing $O_2$ and removing pollutants in the exhaust gas of said engine, and an air-fuel ratio sensor, disposed downstream of or within said three-way catalyst converter, for detecting a specific component in the exhaust gas, said apparatus comprising:
  means for changing a coarse-adjusting term, said changing means gradually increasing said coarse-adjusting term when an output of said air-fuel ratio sensor is smaller than a first predetermined value corresponding to a stoichiometric air-fuel ratio to gradually make an actual air-fuel ratio upstream of said catalyst converter rich with respect to said stoichiometric air-fuel ratio and gradually decreasing said coarse-adjusting term when said output of said air-fuel ratio sensor is larger than said first predetermined value in order to gradually make said actual air-fuel ratio lean with respect to said stoichiometric air-fuel ratio;
  means for determining an output of said air-fuel ratio sensor;
  means for setting a skip $O_2$ storage term of an $O_2$ storage term, said setting means setting said skip $O_2$ storage term to:
    a first fixed value to immediately make said actual air-fuel ratio rich with respect to said stoichiometric ratio when said output of said air-fuel ratio sensor becomes smaller than a second predetermined value that is smaller than said first predetermined value; and
    a second fixed value to immediately make said actual air-fuel ratio lean with respect to said stoichiometric ratio when said output of said air-fuel ratio sensor becomes larger than a third predetermined value that is larger than said first predetermined value; and
  means for changing an integral $O_2$ storage term of said $O_2$ storage term, said changing means:
    gradually increasing said integral $O_2$ storage term as long as said output of said air-fuel ratio sensor is smaller than said second predetermined value; and
    gradually decreasing said integral $O_2$ storage term as long as said output of said air-fuel ratio sensor is larger than said third predetermined value; and
  means for adjusting said actual air-fuel ratio upstream of said three-way catalyst converter in accordance with said coarse-adjusting term and said $O_2$ storage term formed by said skip $O_2$ storage term and said integral $O_2$ storage term.

44. The apparatus of claim 43, wherein said integral $O_2$ storage term is varied more rapidly than said coarse-adjusting term.

45. Apparatus for controlling an air-fuel ratio in an internal combustion engine having a three-way catalyst converter for storing $O_2$ and removing pollutants in the exhaust gas of said engine, and an air-fuel ratio sensor, disposed downstream of or within said three-way catalyst converter, for detecting a specific component in the exhaust gas, said apparatus comprising:
  means for changing a coarse-adjusting term, said changing means gradually increasing said coarse-adjusting term when an output of said air-fuel ratio sensor is smaller than a first predetermined value corresponding to a stoichiometric air-fuel ratio to gradually make an actual air-fuel ratio upstream of said catalyst converter rich with respect to said stoichiometric air-fuel ratio and gradually decreasing said coarse-adjusting term when said output of said air-fuel ratio sensor is larger than said first predetermined value in order to gradually make said actual air-fuel ratio lean with respect to said stoichiometric air-fuel ratio;
  means for determining an output of said air-fuel ratio sensor;
  means for setting a skip $O_2$ storage term of an $O_2$ storage term, said setting means setting said skip $O_2$ storage term to:
    a first fixed value to immediately make said actual air-fuel ratio rich with respect to said stoichiometric ratio when said output of said air-fuel ratio sensor becomes smaller than a second predetermined value that is smaller than said first predetermined value and resetting said fixed first value of said skip $O_2$ storage term when said output of said air-fuel ratio sensor becomes larger than said second predetermined value; and
    a second fixed value to immediately make said actual air-fuel ratio lean with respect to said stoichiometric ratio when said output of said air-fuel ratio sensor becomes larger than a third predetermined value that is larger than said first predetermined value and resetting said fixed second value of said skip $O_2$ storage term when said output of said air-fuel ratio sensor becomes smaller than said third predetermined value; and means for changing an integral O$_2$ storage term of said O$_2$ storage term, said changing means:
- gradually increasing said integral O$_2$ storage term as long as said output of said air-fuel ratio sensor is smaller than said second predetermined value and holding said integral O$_2$ storage term constant at a time when said output of said air-fuel ratio sensor becomes larger than said second value of said integral O$_2$ storage term until said output of said air-fuel ratio sensor becomes larger than said first value; and
- gradually decreasing said integral O$_2$ storage term as long as said output of said air-fuel ratio sensor is larger than said third predetermined value and holding said integral O$_2$ storage term constant at a time when said output of said integral O$_2$ storage term until said output of said air-fuel ratio sensor becomes smaller than said first value; and means for adjusting said actual air-fuel ratio upstream of said three-way catalyst converter in accordance with said coarse-adjusting term and said O$_2$ storage term formed by said skip O$_2$ storage term and said integral O$_2$ storage term.

46. The apparatus of claim 45, wherein said integral O$_2$ storage term is varied more rapidly than said coarse-adjusting term.

47. Apparatus for controlling an air-fuel ratio in an internal combustion engine having a three-way catalyst converter for storing O$_2$ and removing pollutants in the exhaust gas of said engine, and an air-fuel ratio sensor, disposed downstream of or within said three-way catalyst converter, for detecting a specific component in the exhaust gas, said apparatus comprising:

means for changing a coarse-adjusting term, said changing means gradually increasing said coarse-adjusting term when an output of said air-fuel ratio sensor is smaller than a first predetermined value corresponding to a stoichiometric air-fuel ratio to gradually make an actual air-fuel ratio upstream of said catalyst converter rich with respect to said stoichiometric air-fuel ratio and gradually decreasing said coarse-adjusting term when said output of said air-fuel ratio sensor is larger than said first predetermined value in order to gradually make said actual air-fuel ratio lean with respect to said stoichiometric air-fuel ratio.

means for determining an output of said air-fuel ratio sensor;

means for setting a skip O$_2$ storage term of an O$_2$ storage term, said setting means setting said skip O$_2$ storage term to:
- a first fixed value to immediately make said actual air-fuel ratio rich with respect to said stoichiometric ratio when said output of said air-fuel ratio sensor becomes smaller than a second predetermined value that is smaller than said first predetermined value and resetting said fixed first value of said skip O$_2$ storage term when said output of said air-fuel ratio sensor becomes larger than said second predetermined value; and
- a second fixed value to immediately make said actual air-fuel ratio lean with respect to said stoichiometric ratio when said output of said air-fuel ratio sensor becomes larger than a third predetermined value that is larger than said first predetermined value and resetting said fixed second value of said skip O$_2$ storage term when said output of said air-fuel ratio sensor becomes smaller than said third predetermined value; and means for changing an integral O$_2$ storage term of said O$_2$ storage term, said changing means:
- gradually increasing said integral O$_2$ storage term as long as said output of said air-fuel ratio sensor is smaller than said second predetermined value and gradually decreasing said integral O$_2$ storage term of said O$_2$ storage term from a time when said output of said air-fuel ratio sensor becomes larger than said second predetermined value to a time when said output of said air-fuel ratio sensor becomes larger than said first predetermined value; and
- gradually decreasing said integral O$_2$ storage term as long as said output of said air-fuel ratio sensor is larger than said third predetermined value and gradually increasing said integral O$_2$ storage term of said O$_2$ storage term from a time when said output of said air-fuel ratio sensor becomes smaller than said third predetermined value to a time when said output of said air-fuel ratio sensor becomes smaller than said first predetermined value; and means for adjusting said actual air-fuel ratio upstream of said three-way catalyst converter in accordance with said coarse-adjusting term and said O$_2$ storage term formed by said skip O$_2$ storage term and said integral O$_2$ storage term.

48. The apparatus of claim 47, further including:
a counter, said counter counting a first time when said output of said air-fuel ratio sensor continuously stays between said first predetermined value and said second predetermined value and counting a second time when said output of said air-fuel ratio sensor continuously stays between said first predetermined value and said third predetermined value, said changing means gradually increasing said integral O$_2$ storage term of said O$_2$ storage term from a time when said counted first time is longer than said first predetermined time and gradually decreasing said integral O$_2$ storage term of said O$_2$ storage term from a time when said counted second time is longer than said second predetermined time.

49. The apparatus of claim 48, wherein:
said changing means gradually increases said integral O$_2$ storage term of said O$_2$ storage term by resetting said integral O$_2$ storage when said output of said air-fuel ratio sensor crosses said first predetermined value; and
said changing means gradually decreases said integral O$_2$ storage term of said O$_2$ storage term by resetting said integral O$_2$ storage when said output of said air-fuel ratio sensor crosses said first predetermined value.

50. The apparatus of claim 47, wherein said integral O$_2$ storage term is varied more rapidly than said coarse-adjusting term.

51. The apparatus of claim 50, further including:
a counter, said counter counting a first time when said output of said air-fuel ratio sensor continuously stays between said first predetermined value and said second predetermined value and counting a second time when said output of said air-fuel ratio sensor continuously stays between said first predetermined value and said third predetermined value, said changing means gradually increasing said integral O$_2$ storage term of said O$_2$ storage term from a time when said counted first time is longer than said first predetermined time and gradually decreasing said integral $O_2$ storage term of said $O_2$ storage term from a time when said counted second time is longer than said second predetermined time.

52. The apparatus of claim 51, wherein:
said changing means gradually increases said integral $O_2$ storage term of said $O_2$ storage term by resetting said integral $O_2$ storage when said output of said air-fuel ratio sensor crosses said first predetermined value; and
said changing means gradually decreases said integral $O_2$ storage term of said $O_2$ storage term by resetting said integral $O_2$ storage when said output of said air-fuel ratio sensor crosses said first predetermined value.

53. Apparatus for controlling an air-fuel ratio in an internal combustion engine having a three-way catalyst converter for storing $O_2$ and removing pollutants in the exhaust gas of said engine, and an air-fuel ratio sensor, disposed downstream of or within said three-way catalyst converter, for detecting a specific component in the exhaust gas, said apparatus comprising:
means for changing a coarse-adjusting term, said changing means gradually increasing said coarse-adjusting term when an output of said air-fuel ratio sensor is smaller than a first predetermined value corresponding to a stoichiometric air-fuel ratio to gradually make an actual air-fuel ratio upstream of said catalyst converter rich with respect to said stoichiometric air-fuel ratio and gradually decreasing said coarse-adjusting term when said output of said air-fuel ratio sensor is larger than said first predetermined value in order to gradually make said actual air-fuel ratio lean with respect to said stoichiometric air-fuel ratio;
means for setting an $O_2$ storage term, said setting means setting said $O_2$ storage term to:
a first value to rapidly expel excessive $O_2$ from said three-way catalyst converter when an amount of $O_2$ introduced into said three-way catalyst converter becomes larger than an amount of $O_2$ fully stored in said three-way catalyst converter;
a second value to rapidly reduce un-burned pollutants such as HC and CO introduced into said three-way catalyst converter after said amount of $O_2$ is fully stored in said three-way catalyst converter, when said amount of $O_2$ stored in said three-way catalyst converter is completely consumed; and
a third value when said storage term is not set to either said first or said second values; and
means for adjusting said actual air-fuel ratio upstream of said three-way catalyst converter in accordance with said coarse-adjusting term and said $O_2$ storage term.

54. The apparatus of claim 53, wherein:
in setting said $O_2$ storage term to said first value, said setting means determines whether or not said output of said air-fuel ratio sensor reaches a lean value shifted by a large amount to said lean side from a value corresponding to said stoichiometric air-fuel ratio, thereby determining whether said amount of $O_2$ introduced into said three-way catalyst converter becomes larger than said amount of $O_2$ fully stored in said three-way catalyst converter; and
in setting said $O_2$ storage term to said second value, said setting means determines whether said output of said air-fuel ratio sensor reaches a rich value shifted by a large amount to said rich side from a value corresponding to said stoichiometric air-fuel ratio, thereby determining whether or not said amount of $O_2$ stored in said three-way catalyst converter is completely consumed.

55. The apparatus of claim 53, wherein:
in setting said $O_2$ storage term to said first value, said setting means determines whether a change of a load of said engine is larger than a predetermined positive change, thereby determining whether said amount of $O_2$ introduced into said three-way catalyst converter becomes larger than said amount of $O_2$ fully stored in said three-way catalyst converter; and
in setting said $O_2$ storage term to said second value, said setting means determines whether said change of said load of said engine is smaller than a predetermined negative change, thereby determining whether or not said amount of $O_2$ stored in said three-way catalyst converter is completely consumed.

56. The apparatus of claim 55, wherein said first and second values are changed in accordance with said change of said load of said engine.

57. The apparatus of claim 53, wherein:
said first value is a positive value by which said output of said air-fuel ratio sensor is on said rich side with respect to said stoichiometric air-fuel ratio;
said second value is a negative value by which said output of said air-fuel ratio sensor is on said lean side with respect to said stoichiometric air-fuel ratio; and
said third value is zero by which said output of said air-fuel ratio sensor is maintained.

58. The apparatus of claim 57, wherein:
in setting said $O_2$ storage term to said first value, said setting means determines whether a change of a load of said engine is larger than a predetermined positive change, thereby determining whether said amount of $O_2$ introduced into said three-way catalyst converter becomes larger than said amount of $O_2$ fully stored in said three-way catalyst converter; and
in setting said $O_2$ storage term to said second value, said setting means determines whether said change of said load of said engine is smaller than a predetermined negative change, thereby determining whether or not said amount of $O_2$ stored in said three-way catalyst converter is completely consumed.

59. The apparatus of claim 58, wherein said first and second values are changed in accordance with said change of said load of said engine.

60. The apparatus of claim 57, wherein:
in setting said $O_2$ storage term to said first value, said setting means determines whether or not said output of said air-fuel ratio sensor reaches a lean value shifted by a large amount to said lean side from a value corresponding to said stoichiometric air-fuel ratio, thereby determining whether said amount of $O_2$ introduced into said three-way catalyst converter becomes larger than said amount of $O_2$ fully stored in said three-way catalyst converter; and
in setting said $O_2$ storage term to said second value, said setting means determines whether said output of said air-fuel ratio sensor reaches a rich value shifted by a large amount to said rich side from a value corresponding to said stoichiometric air-fuel ratio, thereby determining whether or not said amount of $O_2$ stored in said three-way catalyst converter is completely consumed.

61. The apparatus of claim 60, wherein the absolute values of said first and second values are larger when said output of said air-fuel ratio sensor is deviated greatly from the value corresponding to said stoichiometric air-fuel ratio.

62. The apparatus of claim 60, wherein:

the absolute value of said first value is larger when a period wherein said output of said air-fuel ratio sensor is on said lean side with respect to said stoichiometric air-fuel ratio is longer; and the absolute value of said second value is larger when a duration wherein the output of said air-fuel ratio sensor is on said rich side with respect to said stoichiometric air-fuel ratio is longer.

63. The apparatus of claim 60, wherein in setting said $O_2$ storage term to said first value, said setting means sets a first fixed value as said first value in said $O_2$ storage term, when said output of said air-fuel ratio sensor reaches said lean value and gradually increases said absolute value of said $O_2$ storage term when said output of said air-fuel ratio sensor is on said lean side with respect to said stoichiometric air-fuel ratio.

64. The apparatus of claim 60, wherein:

in setting said $O_2$ storage term to said second value, said setting means sets a second fixed value as said second value in said $O_2$ storage term when said output of said air-fuel ratio sensor reaches said rich value and gradually increases said absolute value of said $O_2$ storage term when said output of said air-fuel ratio sensor is on said rich side with respect to said stoichiometric air-fuel ratio.

* * * * *

UNITED STATES PATENT AND TRADEMARK OFFICE
CERTIFICATE OF CORRECTION

PATENT NO. : 5,172,320

DATED : 15 December 1992

INVENTOR(S) : Mitsuhiro NADA

Page 1 of 3

It is certified that error appears in the above-indentified patent and that said Letters Patent is hereby corrected as shown below:

| Column | Line | |
|---|---|---|
| 3 | 12 | After "23;" Figs. 26A should start new paragraph. |
| 3 | 25 | After "output" insert --$V_{ox}$--. |
| 3 | 32 | After "output" insert --$V_{ox}$--. |
| 3 | 46 | Change "$AF_{s2}$to" to --$AF_{s2}$ to--. |
| 4 | 50 | Before "throttle" change "an" to --a--. |
| 4 | 56 | Change "$10_2$" to --102--. |
| 6 | 3 | After "accordance" insert --with--. |
| 8 | 17 | After "term" insert --$AF_{CCRO}$--. |
| 8 | 29 | After "term" insert --$AF_{CCRO}$--. |
| 8 | 62 | Change "$AF_{CCRO}\cdot\cdot f_3$," to --$AF_{CCRO} \leftarrow f_3$--. |
| 10 | 44 | After "output" insert --$V_{ox}$--. |
| 13 | 33 | After "satisfies" insert --$AF_{CCROP} > \Delta AF_{CCRO1}$.--. |
| 13 | 47 | After "amount" insert --$AF_{CCRO1}$.--. |
| 14 | 21 | After "output" insert --$V_{ox}$--. |

UNITED STATES PATENT AND TRADEMARK OFFICE
CERTIFICATE OF CORRECTION

PATENT NO. : 5,172,320
DATED : 15 December 1992
INVENTOR(S) : Nitsuhiro NADA

Page 2 of 3

It is certified that error appears in the above-indentified patent and that said Letters Patent is hereby corrected as shown below:

| Column | Line | |
|---|---|---|
| 14 | 51 | After "output" insert --$V_{ox}$--. |
| 14 | 58 | Change "attributes" to --contributes--. |
| 14 | 68 | Change "by" to --at--. |
| 15 | 5 | Change "by" to --at--. |
| 15 | 67 | Change "$AFA_{CCRO1}$" to --$AF_{CCRO1}$--. |
| 17 | 3 | Change "903" to --2903--. |
| 17 | 9 | Change "906" to --2906--. |
| 17 | 43 | Change "value" to --valve--. |
| 18 | 39 | After "positive" insert --value--. |
| 18 | 45 | Change "claim 1" to --claim 2--. |
| 18 | 49 | Change "claim 1" to --claim 2--. |
| 23 | 8 | Change "cross" to --crosses--. |
| 23 | 11 | After "storage" insert --term--. |
| 23 | 37 | After "storage" insert --term--. |

UNITED STATES PATENT AND TRADEMARK OFFICE
CERTIFICATE OF CORRECTION

PATENT NO. : 5,172,320
DATED : 15 December 1992
INVENTOR(S) : Mitsuhiro NADA

It is certified that error appears in the above-indentified patent and that said Letters Patent is hereby corrected as shown below:

| Column | Line | |
|---|---|---|
| 23 | 41 | After "storage" insert --term--. |
| 23 | 68 | After "three-way" insert --catalyst--. |
| 24 | 7 | Delete "one". |
| 26 | 54 | After "gas" insert --,--. |
| 29 | 16 | Before "integral" insert --air-fuel ratio sensor becomes smaller than said third value of said--. |
| 30 | 24 | After "and" start new paragraph. |
| 30 | 48, 53 | After "storage" insert --term--. |
| 31 | 9, 14 | After "storage" insert --term--. |

Signed and Sealed this

Fourth Day of August, 1998

Attest:

BRUCE LEHMAN

Attesting Officer

Commissioner of Patents and Trademarks